(12) United States Patent
Urano et al.

(10) Patent No.: US 11,135,865 B2
(45) Date of Patent: *Oct. 5, 2021

(54) METHOD FOR PRODUCING PRINTED MATTER

(71) Applicant: RISO KAGAKU CORPORATION, Tokyo (JP)

(72) Inventors: Yuki Urano, Ibaraki (JP); Akiko Hayashi, Ibaraki (JP); Takahisa Yamazaki, Ibaraki (JP); Mamoru Fukuda, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,618

(22) Filed: Feb. 27, 2020

(65) Prior Publication Data

US 2020/0276850 A1 Sep. 3, 2020

(30) Foreign Application Priority Data

Feb. 28, 2019 (JP) .............................. JP2019-035327
Feb. 28, 2019 (JP) .............................. JP2019-036219

(51) Int. Cl.
*B41M 5/00* (2006.01)
*B41J 2/21* (2006.01)
(Continued)

(52) U.S. Cl.
CPC .......... *B41M 5/0017* (2013.01); *B41J 2/2107* (2013.01); *C09D 11/322* (2013.01); *C09D 11/38* (2013.01)

(58) Field of Classification Search
CPC ... B41J 2/01; B41J 2/211; B41J 2/1433; B41J 2/17593; B41J 2/2107; B41J 2/1755;
(Continued)

(56) References Cited

U.S. PATENT DOCUMENTS 9,902,833 B2 2/2018 Sugiyama et al.
2007/0067928 A1* 3/2007 Ellis ..................... C09D 11/322
8/445

(Continued)

FOREIGN PATENT DOCUMENTS

JP 2003-055886 2/2003
JP 2006-132034 5/2006

(Continued)

OTHER PUBLICATIONS

U.S. Appl. No. 16/803,591, filed Feb. 27, 2020.

*Primary Examiner* — Manish S Shah
(74) *Attorney, Agent, or Firm* — Hamre, Schumann, Mueller & Larson, P.C.

(57) ABSTRACT

A method for producing printed matter that includes applying one of a first pretreatment liquid and a second pretreatment liquid, the other of the first pretreatment liquid and the second pretreatment liquid, and then an aqueous ink, in this order, to a recording region of a substrate using an inkjet recording apparatus, wherein the first pretreatment liquid and the second pretreatment liquid are jetted so as to land on the substrate in a fixed order, the first pretreatment liquid contains a coagulant, and the second pretreatment liquid does not contain a coagulant, but contains a penetrant.

16 Claims, 2 Drawing Sheets

(51) Int. Cl.
*C09D 11/38* (2014.01)
*C09D 11/322* (2014.01)

(58) Field of Classification Search
CPC ...... B41J 2/2114; B41J 2/2117; B41J 2/2056;
B41J 2/21; B41J 2/0057; B41J 3/60;
B41J 2002/012; B41J 2/04598; B41J
2/04588; B41J 2/04595; B41J 2/04586;
B41J 2/14274; B41J 2/1623; B41J
2202/00; B41J 2202/03; B41J 2/14201;
B41J 2/045; B41J 11/0015; B41J 11/002;
B41J 2/0458; B41J 2/055; B41J
202/16502; B41J 2/16538; B41J
2002/16502; B41J 29/02; B41J 2/17513;
B41J 2/17509; B41J 29/13; B41J
2/17553; B41J 2/1606; B41J 2/1642;
B41J 2/1609; B41J 2/164; B41J 2/162;
B41J 2/161; B41J 2/19; B41J 15/04;
B41J 25/001; B41J 25/34; B41J 25/003;
B41J 25/312; B41J 2025/008; B41J
2202/21; B41J 2/17596; B41J 2/16508;
B41J 2/1652; B41J 2/175; B41J 2/17563;
B41M 5/0011; B41M 5/0017; B41M
5/0023; B41M 5/0047; B41M 7/00;
B41M 7/0072; B41M 5/52; B41M
5/5218; B41M 5/5227; C09D 11/36;
C09D 11/40; C09D 11/30; C09D 11/38;
C09D 11/32; C09D 11/322; C09D
11/324; C09D 11/328; C09D 11/101;
C09D 11/102; C09D 11/005; C09D
11/54; C09D 11/52; C09D 11/106; C09D
11/326; C09D 11/107; C09D 11/03;
C09D 11/037; C09D 11/033
See application file for complete search history.

(56) References Cited

U.S. PATENT DOCUMENTS

| | | | | |
|---|---|---|---|---|
| 2011/0102497 | A1* | 5/2011 | Sato | B41M 5/0017 347/21 |
| 2011/0200751 | A1* | 8/2011 | Yatake | B41J 3/4078 427/261 |
| 2011/0279517 | A1* | 11/2011 | Katsuragi | B41J 2/2114 347/21 |
| 2015/0054885 | A1* | 2/2015 | Sugiyama | D06P 1/5292 347/21 |
| 2015/0217576 | A1* | 8/2015 | Yatake | B41J 3/4078 347/21 |

FOREIGN PATENT DOCUMENTS

| | | |
|---|---|---|
| JP | 2009-154312 | 7/2009 |
| JP | 2010-150453 | 7/2010 |
| JP | 2011-168912 | 9/2011 |
| JP | 2015-161043 | 9/2015 |
| JP | 2017-094672 | 6/2017 |

* cited by examiner

METHOD FOR PRODUCING PRINTED MATTER

CROSS REFERENCE TO RELATED APPLICATIONS

This application is based upon and claims the benefit of priority from the prior Japanese Patent Application No. 2019-036219, filed on Feb. 28, 2019, the entire contents of which are incorporated by reference herein, and the prior Japanese Patent Application No. 2019-035327, filed on Feb. 28, 2019, the entire contents of which are incorporated by reference herein.

BACKGROUND OF THE INVENTION

Field of the Invention

Embodiments of the present invention relate to a method for producing printed matter.

Description of the Related Art

The inkjet recording method is a method in which an inkjet ink of high fluidity is jetted from fine nozzles in the form of liquid droplets, thereby recording an image on a substrate positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility.

Because aqueous inks use water as the main solvent, they have little impact on the environment, and because the solvent volatilizes readily, the produced printed matter exhibits excellent drying properties. On the other hand, depending on the type of substrate used, aqueous inks can sometimes lack satisfactory permeability into the substrate, meaning satisfactory image fixability can sometimes not be obtained. Further, methods in which a penetrant is added to the aqueous ink to improve the permeability into substrates are known, but because the permeability into the substrate is enhanced, the colorant of the aqueous ink may sometimes penetrate into regions beyond the recording region, causing bleeding of the image. Furthermore, when printing broad recording regions such as solid images or photographic images, irregularities may sometimes occur in the image.

In order to prevent image bleeding caused by aqueous inks, methods have been developed in which the substrate is first treated with a pretreatment agent containing a coagulant, and the aqueous ink is then applied. Because the coagulant that has been applied to the substrate causes the colorant of the aqueous ink to aggregate, penetration of the colorant into portions of the substrate beyond the recording region can be prevented.

JP 2017-94672 A discloses a liquid jetting method in which a medium is coated with a pretreatment liquid and an ink is then jetted onto the medium, wherein by changing the order in which a plurality of pretreatment liquids of different permeability are overlaid in accordance with the type of medium, the permeability and wet spreadability of the pretreatment liquid can be stabilized regardless of the characteristics of the medium, and the wet spreadability of the pretreatment liquid can be improved while enhancing the reactivity between the pretreatment liquid and the ink.

JP 2017-94672 A discloses that a first pretreatment liquid and a second pretreatment liquid each contain a solution component and a reactive component such as a coagulant, wherein the reactive components in the first pretreatment liquid and the second pretreatment liquid are the same, but the permeability differs between the two pretreatment liquids. Further, in one embodiment of JP 2017-94672 A, a liquid jetting apparatus fitted with a serial head is used to jet the first pretreatment liquid on the outward path, and jet the second pretreatment liquid on the return path, thereby overlapping the two pretreatment liquids

SUMMARY OF THE INVENTION

One embodiment of the present invention provides a method for producing printed matter that includes applying one of a first pretreatment liquid and a second pretreatment liquid, the other of the first pretreatment liquid and the second pretreatment liquid, and an aqueous ink, in this order, to a recording region of a substrate using an inkjet recording apparatus, wherein the first pretreatment liquid and the second pretreatment liquid are jetted so as to land on the substrate in a fixed order, the first pretreatment liquid contains a coagulant, and the second pretreatment liquid does not contain a coagulant, but contains a penetrant.

DETAILED DESCRIPTION OF THE EMBODIMENTS

Figure 1:
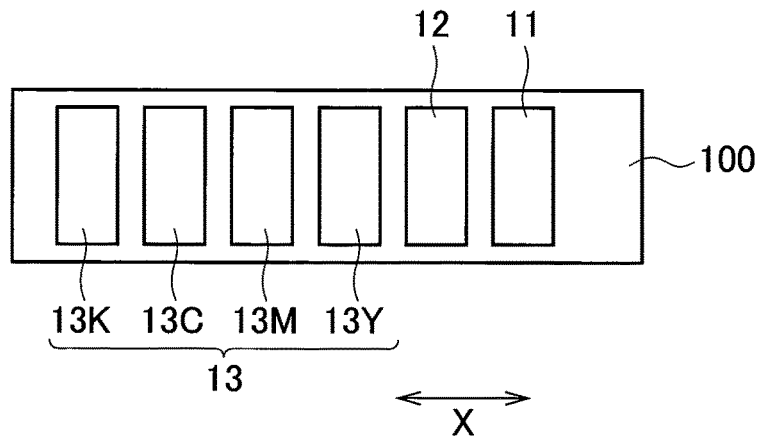
FIG. 1 is a top view schematically illustrating one example of a serial-type recording head unit.

Embodiments of the present invention are described below in detail, but the present invention is not limited to the following embodiments, and needless to say, various amendments or modifications may be made.

First Embodiment

A first embodiment is described below.
JP 2017-94672 A discloses that by coating a highly permeable medium with a pretreatment liquid having high permeability and then a pretreatment liquid having low permeability, the pretreatment liquid having low permeability that lands on the medium later does not permeate into the medium but is rather retained on the medium surface, thereby improving the reactivity with the ink and the wet spreadability of the ink.

In order to further enhance the fixability of an image to a substrate, it is preferable that the aqueous ink penetrates into the interior of the substrate, with the colorant spreading into the interior of the substrate. Further, in order to prevent image bleeding, it is preferable that the colorant of the aqueous ink does not penetrate into portions in the interior of the substrate beyond the recording region. In methods such as that described in JP 2017-94672 A, in which two types of pretreatment liquids are retained on the medium surface, satisfactorily improving both the fixability of the image and image bleeding can sometimes be problematic.

Method for Producing Printed Matter

A method for producing printed matter according to one embodiment may include applying one of a first pretreatment liquid and a second pretreatment liquid, the other of the first pretreatment liquid and the second pretreatment liquid, and an aqueous ink, in this order, to a recording region of a substrate. It is preferable that the first pretreatment liquid and the second pretreatment liquid are jetted so as to land on the substrate in a fixed order. Further, it is preferable that the first pretreatment liquid contains a coagulant, and the second pretreatment liquid does not contain a coagulant, but contains a penetrant.

By using this method, the image quality of the printed matter and the fixability of the image to the printed matter can be improved.

Further, the back surface density of the printed matter can be enhanced, and the printed matter can be used favorably in applications that require visibility of the image from the back surface of the printed matter.

By applying the first treatment liquid containing a coagulant, and the second pretreatment liquid that does not contain a coagulant, but contains a penetrant, to a substrate, and causing the coagulant to penetrate into the interior of the substrate, image bleeding or irregularities can be prevented. Further, because the coagulant penetrates into the interior of the substrate together with the penetrant, the colorant of the aqueous ink aggregates not only on the surface portion of the substrate, but also within the interior of the substrate as the aqueous ink penetrates into the substrate interior, meaning the image fixability can be improved.

Further, by not including a coagulant in the second pretreatment liquid, excessive aggregation of the ink by the coagulant is moderated, and the aqueous ink is able to penetrate into the interior of the substrate while the colorant undergoes aggregation and fixation, meaning visibility of the image from the back surface of the substrate can be achieved. Such images can be used favorably, for example, in applications such as advertising banners, flags and shop curtains which require visibility from the back surface of the printed surface.

Furthermore, because the aqueous ink penetrates into the interior of the substrate, in those cases where the aqueous ink contains a resin component, an anchoring effect can be obtained from the resin coating film, enabling the fixability of the image to be further improved.

In those cases where the first pretreatment liquid and the second pretreatment liquid are applied to the substrate using an inkjet recording apparatus fitted with a serial-type recording head unit disposed along the main scanning direction, if the first pretreatment liquid and the second pretreatment liquid are jetted in this order during the first pass on the outward path, and the second pretreatment liquid and the first pretreatment liquid are then jetted in this order during the second pass on the return path, then the application order of the first pretreatment liquid and the second pretreatment liquid is reversed for each line along the substrate transport direction corresponding with a pass. If an aqueous ink is then applied to a substrate that has been treated in this manner, then the permeability of the aqueous ink into the substrate will differ for each line, and therefore penetration of the aqueous ink into the substrate is impeded, and the effects described above may sometimes be unobtainable. Accordingly, it is preferable that the first pretreatment liquid, the second pretreatment liquid and the aqueous ink are applied to the recording region on the substrate in a prescribed order, so that the layering order of the first pretreatment liquid, the second pretreatment liquid and the aqueous ink is the same across the entire recording region.

The method for producing printed matter according to one embodiment enables images to be formed favorably on a variety of substrates.

Examples of the substrate include printing papers such as plain papers, coated papers and specialty papers, as well as fabrics, wooden substrates, metal substrates, glass substrates and resin substrates. Among these, using a fabric enables an image of particularly improved image quality and fixability to be recorded.

Examples of the fabric include fabrics formed from natural fibers such as cotton, silk, wool and linen; fabrics formed from chemical fibers such as polyester, acrylic, polyurethane, nylon, rayon, copra, acetate, polyvinyl chloride, polyvinylidene chloride, polyethylene, polypropylene, polystyrene and polyfluoroethylene; and fabrics formed from mixed spun fibers of the above fibers. Further, the fabric may be a woven fabric, a knitted fabric, or a nonwoven fabric or the like Additional examples of the fabric include fabrics formed from inorganic fibers such as metal fibers, glass fibers, rock fibers and slag fibers, fabrics formed from recycled fibers such as cellulose-based fibers and protein-based fibers, and fabrics formed from semi-synthetic fibers such as cellulose-based fibers.

Natural fibers and chemical fibers can be used particularly favorably as the fabric, and specific examples include cotton and polyester.

First Pretreatment Liquid

The first pretreatment liquid preferably contains a coagulant. Applying the first pretreatment liquid containing a coagulant to the substrate imparts an action that causes aggregation of the colorant of the aqueous ink on the substrate. Accordingly, the first pretreatment liquid can prevent bleeding of the colorant on the substrate, and reduce color irregularities in the printed matter. Furthermore, because wet spreading of the colorant is suppressed, the image density of the printed matter can be increased.

The first pretreatment liquid preferably contains the coagulant and water, and water is preferably the main solvent medium. Further, a water-soluble organic solvent may be used in addition to the water, or instead of the water.

The coagulant preferably has an action that reduces the dispersibility or solubility of the colorant in the aqueous ink, thereby causing aggregation of the colorant. Specifically, compounds that exhibit ionicity or acids may be used. In a typical aqueous ink, the colorant itself, or a colorant dispersant, adjusts the charge balance on the colorant surface, thereby dispersing or dissolving the colorant in the water. Accordingly, it is thought that adding these types of compounds destroys this charge balance, causing aggregation of the colorant.

Examples of compounds that may be used favorably as the coagulant include organic acids, polyvalent metals salts, and cationic resins and the like.

Organic acids are organic compounds that exhibit acidity, and specific examples of compounds that may be used favorably include organic compounds having an acidic group such as a carboxyl group, phenolic hydroxyl group or sulfo group. Among these, from the viewpoint of facilitating formation of the hydrogen bonding described below, a carboxyl group is preferred.

Organic acids cause interactions such as hydrogen bonding with the substrate, and can further improve the adhesion to the substrate. Further, as a result of interactions such as hydrogen bonding, organic acids can improve the adhesion with aqueous ink components on the substrate, enabling the image fixability to be further improved.

Furthermore, in those cases where the aqueous ink contains a crosslinking agent, when the organic acid and the crosslinking agent make contact on the substrate, the organic acid undergoes insolubilization, which can enhance the water resistance of the image.

Examples of the organic acid include carboxylic acids such as formic acid, acetic acid and oxalic acid, hydroxycarboxylic acids such as lactic acid, glyceric acid, tartaric acid, citric acid and malic acid, as well as ascorbic acid and sulfonic acid and the like.

From the viewpoint of improving the rub fastness of the substrate, and in particular, enhancing the fabric wet rubbing fastness of the substrate, an organic acid that is liquid at 23° C. is preferably used as the coagulant. By enabling the coagulant to be applied to the fabric surface as a liquid, superior permeability and printed surface smoothness can be achieved, meaning the effects of friction can be reduced. Further, in those cases where each of the pretreatment liquids is applied using an inkjet recording apparatus, using a liquid organic acid as the coagulant enables misfires in the recording head to be prevented across long periods of time.

Acetic acid, lactic acid, or a combination thereof can be used favorably as the organic acid that is liquid at 23° C., and lactic acid is particularly desirable.

The boiling point of the organic acid is preferably at least 120° C.

In the inkjet recording apparatus, the recording head into which the ink has been loaded is used to perform printing by moving the head over the substrate to which each of the pretreatment liquids has been applied. By using an organic acid having a boiling point of at least 120° C., the organic acid is less likely to volatilize from the substrate to which the pretreatment liquids have been applied, and therefore volatilized organic acid does not make contact with the aqueous ink in the nozzle portions of the recording head, and any degeneration of the aqueous ink caused by the organic acid at the nozzle portions can be prevented. As a result, jetting faults of the aqueous ink from the nozzle portions can be suppressed.

One of the organic acids described above may be used alone, or a combination of two or more organic acids may be used.

The amount of the organic acid, relative to the total mass of the first pretreatment liquid, is preferably at least 1% by mass, and more preferably 3% by mass or greater.

The amount of the organic acid, relative to the total mass of the first pretreatment liquid, is preferably not more than 30% by mass, and more preferably 20% by mass or less.

Examples of polyvalent metal salts that may be used include halides, nitrates, sulfates, acetates, fatty acid salts, lactates, and hydrochlorides and the like of divalent or higher metals. Examples of the halides include chlorides, bromides and iodides. Examples of the divalent or higher metals include divalent alkaline earth metals such as Mg, Ca, Sr and Ba, other divalent metals such as Ni, Zn, Cu and Fe(II), and trivalent metals such as Fe(III) and Al, and of these, alkaline earth metals are preferred.

More specific examples of the polyvalent metal salt include calcium chloride, calcium nitrate, magnesium chloride, magnesium nitrate, magnesium sulfate, copper nitrate, calcium acetate and magnesium acetate.

One of the polyvalent metal salts described above may be used alone, or a combination of two or more polyvalent metal salts may be used.

The amount of the polyvalent metal salt, relative to the total mass of the first pretreatment liquid, is preferably at least 1% by mass, and more preferably 3% by mass or greater.

The amount of the polyvalent metal salt, relative to the total mass of the first pretreatment liquid, is preferably not more than 30% by mass, and more preferably 20% by mass or less.

Examples of cationic resins that may be used include cationic water-soluble resins and cationic water-dispersible resins, and combinations thereof may also be used.

Examples of cationic water-soluble resins include polyethyleneimine (PEI), polyvinylamine, polyallylamine and salts thereof, polyvinylpyridine, and cationic acrylamide copolymers.

More specific examples of cationic water-soluble resins that may be used include polyallylamine, polyallylamine sulfate and polyallylamine hydrochloride; as well as allylamine-diallylamine copolymers, allylamine-diallylamine copolymer sulfate, allylamine-diallylamine copolymer hydrochloride, allylamine-dimethylallylamine copolymers, allylamine-dimethylallylamine copolymer sulfate, allylamine-dimethylallylamine copolymer hydrochloride, diallylamine-sulfur dioxide copolymers, diallylamine-sulfur dioxide copolymer sulfate, diallylamine-sulfur dioxide copolymer hydrochloride, methyldiallylamine-sulfur dioxide copolymers, methyldiallylamine-sulfur dioxide copolymer sulfate, methyldiallylamine-sulfur dioxide copolymer hydrochloride, epichlorohydrin-based polymers, and polydiallyldimethylammonium chloride.

Examples of commercially available products of cationic water-soluble resins include the SHALLOL series (including DC-303P and DC-902P (both product names), polydiallyldimethylammonium chloride products) manufactured by DKS Co., Ltd., the UNISENSE series (including FCA1000L, FPA100L, KHE100L, and KHE104L, (all product names)) manufactured by Senka Corporation, and the HC Polymer series (including 1S, 1N, 1NS, 2, and 2L (all product names)) manufactured by Osaka Organic Chemical Industry Co., Ltd.

Further, water-soluble resins having amino groups can also be used favorably as cationic water-soluble resins.

Examples of water-soluble resins having amino groups that may be used include basic polymers such as polyethyleneimine, polyvinylamine, polyallylamine and salts thereof, and polyvinylpyridine, or derivatives of these compounds. Among these, a polyethyleneimine or polyallylamine is preferred.

Examples of commercially available products of polyethyleneimines include the EPOMIN series (including SP-006, SP-012, SP-018 and SP-200 (all product names)) manufactured by Nippon Shokubai Co., Ltd.; and Lupasol FG, Lupsaol G20 Waterfree, and Lupasol PR 8515 (all product names) manufactured by BASF Japan Ltd.

Furthermore, examples of commercially available products of polyallylamines include products manufactured by Nitta Boseki Co., Ltd., including allylamine polymers PAA- 01, PAA-03 and PAA-05, allylamine hydrochloride polymers PAA-HCL-01, PAA-HCL-03 and PAA-HCL-05, and the allylamine amide sulfate polymer PAA-SA (all product names).

Cationic water-dispersible resins are composed of positively charged resin particles in which the surface of the resin particles carries a plus charge, and can be dispersed in water in particulate form without dissolving to forming an oil-in-water (O/W) emulsion. The cationic functional groups of the resin may exist at the particle surfaces such as in a self-emulsifying resin, or the resin may have been subjected to a surface treatment such as the adhering of a cationic dispersant to the surface of the resin particles. Representative examples of the cationic functional group include primary, secondary and tertiary amino groups, as well as a pyridine group, imidazole group, benzimidazole group, triazole group, benzotriazole group, pyrazole group or benzopyrazole group. Examples of the cationic dispersant include primary, secondary, tertiary or quaternary amino group-containing acrylic polymers, polyethyleneimine, cationic polyvinyl alcohol resins, and cationic water-soluble multi-branched polyesteramide resins.

The surface charge of the cationic water-dispersible resin particles can be evaluated using a particle charge meter. By measuring the amount of anions or amount of cations required to neutralize the sample, the amount of surface charge can be calculated. Specifically, the surface charge is preferably within a range from 20 to 500 µeq/g, and is more preferably from 20 to 100 µeq/g. Examples of particle charge meters that may be used include the colloidal particle charge meter "Model CAS" manufactured by Nihon Rufuto Co., Ltd.

A resin that forms a transparent coating film is preferably used as the cationic water-dispersible resin. Further, during production of the treatment liquid, the water-dispersible resin may be added in the form of an oil-in-water resin emulsion.

Examples of cationic water-dispersible resins that can be used include urethane resins, (meth)acrylic resins, styrene-(meth)acrylic resins, polyester resins, olefin resins, vinyl chloride resins, vinyl acetate resins, melamine resins, amide resins, ethylene-vinyl chloride copolymer resins, styrene-maleic anhydride copolymer resins, vinyl acetate-(meth)acrylic copolymer resins, vinyl acetate-ethylene copolymer resins, and mixed resins of the above resins, into which cationic functional groups have been introduced, or which have undergone surface treatment with a cationic dispersant or the like to impart a positive surface charge to the resin. In this description, the term "(meth)acrylic resin" describes both acrylic resins and methacrylic resins (this definition also applies below).

In the water-dispersible resin emulsion, in order to prevent changes in the texture of the substrate surface and prevent exfoliation from the substrate surface, the average particle size (the mean particle size measured on a volume basis using the dynamic light scattering method) of the water-dispersible resin particles that form the emulsion is preferably not more than 10 µm, whereas in order to optimize the pretreatment liquid for jetting from an inkjet recording apparatus, the average particle size of the water-dispersible resin particles is preferably not more than 300 nm, more preferably not more than 200 nm, and even more preferably 150 nm or less.

Furthermore, although there are no particular limitations on the lower limit for the average particle size of the water-dispersible resin particles, from the viewpoint of the wet rubbing resistance of the ink, the average particle size is preferably at least 1 nm, more preferably at least 5 nm, and even more preferably 10 nm or greater.

Examples of commercially available cationic water-dispersible resins include PrintRite DP375 manufactured by The Lubrizol Corporation, SUPERFLEX 620 and 650 manufactured by DKS Co., Ltd., IP-15 and PP-17 manufactured by Chemical Works, Ltd., Polysol AP-1350 manufactured by Showa Denko K.K., VONCOAT SFC-55 manufactured by DIC Corporation, and AQUATEX AC-3100 manufactured by Japan Coating Resin Corporation.

One of the cationic resins described above may be use alone, or a combination of two or more cationic resins may be used.

The amount of the cationic resin, relative to the total mass of the first pretreatment liquid, is preferably at least 1% by mass, and more preferably 3% by mass or greater.

The amount of the cationic resin, relative to the total mass of the first pretreatment liquid, is preferably not more than 30% by mass, and more preferably 20% by mass or less.

One of the coagulants described above may be used alone, or a combination of two or more coagulants may be used. In those cases where two or more coagulants are used, the two or more coagulants are preferably selected so as not to avoid mutual impairment of their actions, and the respective blend amounts are also preferably adjusted as appropriate. For example, using a combination of coagulants that exhibit the same ionicity is preferred.

The total amount of the coagulant, relative to the total mass of the first pretreatment liquid, is preferably at least 1% by mass, more preferably at least 3% by mass, and even more preferably 5% by mass or greater. This ensures that by applying the first pretreatment liquid to the substrate, the coagulant can be applied to the substrate in a suitable amount, and the colorant of the aqueous ink can be appropriately aggregated on the substrate.

The total amount of the coagulant, relative to the total mass of the first pretreatment liquid, is preferably not more than 30% by mass, more preferably not more than 20% by mass, and even more preferably 15% by mass or less. The coagulant has ionicity, and therefore limiting the amount of coagulant can prevent deterioration in the surface quality of the substrate caused by excessive coagulant. Further, any deterioration in the storage stability of the first pretreatment liquid caused by excessive coagulant can also be prevented.

For example, the amount of the coagulant, relative to the total mass of the first pretreatment liquid, is preferably within a range from 1 to 30% by mass, more preferably from 3 to 20% by mass, and even more preferably from 5 to 15% by mass.

In addition to the coagulant, the first pretreatment liquid may also contain a penetrant. This enables the permeability of the first pretreatment liquid into the substrate to be further enhanced, and can promote the penetration of the coagulant into the substrate. Further, in a method in which the first pretreatment liquid is applied first and the second pretreatment liquid is applied thereafter, the substrate and the first pretreatment liquid tend to lack compatibility, and therefore a penetrant is preferably added to the first pretreatment liquid.

Examples of compounds that may be used as the penetrant include a surfactant, a water-soluble organic solvent having an SP value of not more than 14 $(cal/cm^3)^{1/2}$ and the like, and combinations of these compounds. Specifically, the same penetrants as those described below for addition to the second pretreatment liquid may be used.

The amount of the surfactant, relative to the total mass of the first pretreatment liquid, is preferably within a range from 0.1 to 10% by mass, and more preferably from 0.5 to 5% by mass.

The amount of the water-soluble organic solvent having an SP value of not more than 14 $(cal/cm^3)^{1/2}$, relative to the total mass of the first pretreatment liquid, is preferably within a range from 1 to 80% by mass, more preferably from 5 to 50% by mass, and even more preferably from 10 to 30% by mass.

The total amount of the penetrant, relative to the total mass of the first pretreatment liquid, is preferably at least 0.1% by mass, and more preferably 1% by mass or greater. This enables penetration of the first pretreatment liquid into the substrate to be better promoted.

The total amount of the penetrant, relative to the total mass of the first pretreatment liquid, is preferably not more than 60% by mass, more preferably not more than 50% by mass, and even more preferably 40% by mass or less. If the amount of the penetrant exceeds 60% by mass, then depending on the substrate, the components of the first pretreatment liquid penetrate too much, and the colorant aggregation effect may sometimes become difficult to achieve.

For example, the amount of the penetrant, relative to the total mass of the first pretreatment liquid, is preferably within a range from 0.1 to 60% by mass, more preferably from 0.5 to 30% by mass, and even more preferably from 1 to 40% by mass.

The first pretreatment liquid may also contain water. For example, the first pretreatment liquid preferably contains water as the main solvent. There are no particular limitations on the water used, and examples include ion-exchanged water, distilled water, ultrapure water and deionized water.

Water is a solvent having high volatility and evaporates readily from the substrate following application to the substrate, and can therefore promote drying of the printed matter. Further, because water is harmless and safe, and suffers none of the problems associated with VOCs, the surface-treated substrate can be produced as an environmentally friendly product.

The amount of water, relative to the total mass of the first pretreatment liquid, is preferably within a range from 10 to 95% by mass, more preferably from 30 to 90% by mass, and may be from 50 to 80% by mass.

The first pretreatment liquid may contain a water-soluble organic solvent, either in combination with the water, or instead of the water.

Examples of water-soluble organic solvents that may be used include water-soluble organic solvents selected from among the penetrants described below that may be added to the second pretreatment liquid. Further, the water-soluble organic solvents described below that may be added to the aqueous ink may also be used. A single water-soluble organic solvent may be used alone, or a combination of two or more water-soluble organic solvents may be used, and the water-soluble organic solvent preferably forms a single phase in a mixed solvent with water.

The amount of the water-soluble organic solvent, relative to the total mass of the first pretreatment liquid, is preferably within a range from 1 to 50% by mass, and more preferably from 10 to 40% by mass.

The total amount of the water and the water-soluble organic solvent (or if only one is included, the amount of that one, this definition also applies below), relative to the total mass of the first pretreatment liquid, is preferably within a range from 30 to 99% by mass, more preferably from 40 to 95% by mass, and even more preferably from 50 to 90% by mass.

The first pretreatment liquid may also contain a binder resin. By including a binder resin, the fixability of the first pretreatment liquid to the substrate can be further enhanced. Further, the fixability of the aqueous ink to the substrate can be further enhanced.

In order to not affect the ionicity of the coagulant, a nonionic resin can be used particularly favorably as the binder resin. The nonionic resin may be either water-soluble or water-dispersible. Further, a nonionic resin selected from among the resin components described below for addition to the aqueous ink may be used as the nonionic resin. In those cases where the first pretreatment liquid contains a cationic resin as the coagulant, this cationic resin may also have a function as a binder resin.

Further, in order to achieve crosslinking of the binder resin, the first pretreatment liquid may also contain a crosslinking component. Examples of the crosslinking component include blocked isocyanates, oxazoline group-containing compounds, (poly)carbodiimides, aziridine, chelating agents, and silane coupling agents and the like.

When a binder resin is added, the amount of the binder resin, relative to the total mass of the first pretreatment liquid, is preferably within a range from 0.1 to 20% by mass, and more preferably from 1 to 10% by mass. In those cases where the first pretreatment liquid contains a cationic resin, the total amount of the cationic resin and the binder resin preferably satisfies the above range.

Further, when a crosslinking component is included, the amount of the crosslinking component, relative to the total mass of the first pretreatment liquid, is preferably within a range from 0.1 to 5% by mass, and more preferably from 1 to 3% by mass.

In a similar manner to the aqueous ink described below, the first pretreatment liquid may also contain optional components such as humectants, antifoaming agents, pH adjusters, antioxidants, preservatives, surface tension reducers and ultraviolet absorbers and the like, provided the effects of the present invention are not impaired.

There are no particular limitations on the method used for producing the first pretreatment liquid, and production may be performed using typical methods. For example, the first pretreatment liquid may be produced by placing all of the components in a stirring device such as a three-one motor, and mixing and dispersing the components, either in a single batch or in a number of separate batches, and then, if required, passing the resulting dispersion through a filtration device such as a membrane filter.

Second Pretreatment Liquid

The second pretreatment liquid preferably does not contain a coagulant, but contains a penetrant. This able to impart the second pretreatment liquid with an action that modifies the substrate surface and promotes penetration of the aqueous ink into the substrate. Further, the second pretreatment liquid can also improve the fixability of the aqueous ink to the substrate. Furthermore, the second pretreatment liquid promotes penetration of the aqueous ink through to the back surface of the printed matter, and can enhance the visibility of the image from the back surface side of the printed matter.

The second pretreatment liquid preferably contains a penetrant and water, and water is preferably the main solvent. Further, a water-soluble organic solvent may also be used, either in addition to the water, or instead of the water.

The second pretreatment liquid preferably exhibits little effect in aggregating the colorant on the substrate. Further, it is more preferable that the second pretreatment liquid exhibits less effect in aggregating the colorant on the substrate than the first pretreatment liquid.

In order to reduce the colorant aggregation action, the second pretreatment liquid preferably does not contain a coagulant. For example, the amount of coagulant relative to the total mass of the second pretreatment liquid is preferably not more than 1% by mass, more preferably not more than 0.5% by mass, even more preferably not more than 0.1% by mass, and may be essentially 0% by mass. Furthermore, the second pretreatment liquid preferably contains none of the coagulant that is added to the first pretreatment liquid.

Details relating to coagulants are as described above in relation to the first pretreatment liquid.

Examples of compounds that may be used as the penetrant include a surfactant, a water-soluble organic solvent having an SP value of not more than 14 $(cal/cm^3)^{1/2}$ and the like, and combinations of these compounds.

In this description, the SP value refers to the SP value determined using the Fedors equation, and more specifically, is the value calculated using the equation below proposed by Fedors. In the following equation, $\Delta ei$ represents the evaporation energy of the atom or atom grouping of a component i, and $\Delta vi$ represents the molar volume of the atom or atom grouping of the component i (see Hansen Solubility Parameters: A User's Handbook, Second Edition, Charles M. Hansen, CRC Press, 2007).

$$\delta=[(sum\Delta ei)/(sum\Delta vi)]^{1/2}$$

Surfactants include both ionic surfactants and nonionic surfactants, but nonionic surfactants are preferably used. Nonionic surfactants do not affect the charge balance of the aqueous ink, and do not cause aggregation of the colorant of the aqueous ink, and can therefore be used favorably as the penetrant.

Ionic surfactants such as cationic surfactants, anionic surfactants and amphoteric surfactants can sometimes affect the charge balance of the aqueous ink and cause aggregation of the colorant. Accordingly, in those cases where an ionic surfactant is used, a surfactant that does not affect the charge balance of the aqueous ink is preferably used. For example, the types of ionic surfactants that can be added to the aqueous ink may be used. Specifically, in those cases where the colorant of the aqueous ink is a carbon black, an anionic dispersant is frequently used. In such cases, an anionic surfactant may be used as the penetrant of the second pretreatment liquid. Details regarding these types of ionic surfactants that may be added to the aqueous ink are as described below in the section relating to the aqueous ink.

Further, the surfactant may be either a low-molecular weight surfactant or a high-molecular weight surfactant (generally indicating a molecular weight of about 2,000 or greater), but the use of a high-molecular weight surfactant is preferred.

The HLB value of the surfactant is preferably within a range from 5 to 20.

Examples of nonionic surfactants include silicone-based surfactants, acetylene glycol-based surfactants, polyoxyethylene alkyl ether-based surfactants, polyoxypropylene alkyl ether-based surfactants, polyoxyethylene alkyl phenyl ether-based surfactants, polyoxypropylene alkyl phenyl ether-based surfactants, polyoxyethylene fatty acid ester-based surfactants, polyoxypropylene fatty acid ester-based surfactants, sorbitan fatty acid ester-based surfactants, polyoxyethylene sorbitan fatty acid ester-based surfactants, polyoxyethylene sorbitol fatty acid ester-based surfactants, glycerol fatty acid ester-based surfactants, acetylene alcohol-based surfactants, and acetylene group-containing surfactants. Any one of these surfactants may be used alone, or a combination of two or more surfactants may be used.

Among these surfactants, a silicone-based surfactant, an acetylene glycol-based surfactant, or a combination of these two types of surfactant can be used favorably, and a silicone-based surfactant is particularly preferred.

Silicone-based surfactants have an extremely superior surface tension reduction action and contact angle reduction action, and therefore even when the substrate surface is not hydrophilic, the second pretreatment liquid can be rapidly diffused across the substrate surface. As a result, the second pretreatment liquid can be fixed uniformly to the substrate surface, and therefore the aqueous ink can be fixed uniformly to the treated region during printing, enabling a printed image of super color development and quality to be obtained.

Among the various silicone-based surfactants, polyether-modified silicone-based surfactants, alkyl/aralkyl-comodified silicone-based surfactants, and acrylic silicone-based surfactants and the like can be used particularly favorably. Examples of commercially available silicone-based surfactants include the FACE SAG (product name) manufactured by Nissin Chemical Industry Co., Ltd.

Examples of commercially available acetylene glycol-based surfactants include the acetylene glycols Surfynol 104E and 104H, and structures in which ethylene oxide has been added to an acetylene glycol such as Surfynol 420, 440, 465 and 485 (all product names, manufactured by Air Products and Chemicals, Inc.), the acetylene glycols OLFINE E-1004, E-1010, E-1020, PD-002W, PD-004, EXP. 4001, EXP. 4200, EXT. 4123, and EXP. 4300 (all product names, manufactured by Nissin Chemical Industry Co., Ltd.), the acetylene glycols ACETYLENOL E00 and E00P, and structures in which ethylene oxide has been added to an acetylene glycol such as ACETYLENOL E40 and E100 (all product names, manufactured by Kawaken Fine Chemicals Co., Ltd.).

Examples of other nonionic surfactants include polyoxyethylene alkyl ether-based surfactants, such as the EMULGEN series manufactured by Kao Corporation (including EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G).

One of the above surfactants may be used alone, or a combination of two or more surfactants may be used.

The amount of the surfactant, relative to the total mass of the second pretreatment liquid, is preferably at least 0.5% by mass, more preferably at least 1% by mass, and even more preferably 2% by mass or greater.

From the viewpoint of the water resistance, the amount of the surfactant, relative to the total mass of the second pretreatment liquid, is preferably not more than 10% by mass, and more preferably 8% by mass or less.

In terms of water-soluble organic solvents that may be used as the penetrant, by ensuring that the SP value is not more than 14 $(cal/cm^3)^{1/2}$, penetration of the second pretreatment liquid into the substrate can be promoted. Further, the action on the substrate surface that causes the aqueous ink to penetrate into the substrate can be more effectively achieved.

Examples of water-soluble organic solvents having an SP value of not more than 14 $(cal/cm^3)^{1/2}$ include 1,2-butanediol (SP value: 12.8), 1,6-hexanediol (SP value: 13.5), 1,2-propanediol (SP value: 13.5), dipropylene glycol. (SP value: 13.6), diethylene glycol monoethyl ether (SP value: 10.9), diethylene glycol monobutyl ether (SP value: 10.5), diethylene glycol monophenyl ether (SP value: 11.7), diethylene glycol benzyl ether (SP value: 11.5), ethylene glycol propyl ether (SP value: 11.1), diethylene glycol monoethyl ether acetate (SP value: 9.3), tripropylene glycol dimethyl ether (SP value: 8.4), and N-methyl-2-pyrrolidone (SP value: 11.2).

The units for the SP values shown in parentheses are $(cal/cm^3)^{1/2}$.

Although there are no particular limitations on the lower limit for the SP value of the water-soluble organic solvent, an SP value of at least 9 $(cal/cm^3)^{1/2}$ is preferred. If the SP value is less than 9 $(cal/cm^3)^{1/2}$, then the dispersibility or solubility of the colorant in the aqueous ink deteriorates, and aggregation may sometimes occur. In the case of a water-soluble colorant, the solubility may sometimes deteriorate. Further, in those cases where the colorant is dispersed using a dispersant, depending on the type of resin used, the solubility of the resin in the solvent may sometimes become too high, causing the resin adsorbed to the colorant to detach, which may result in colorant particles aggregating together. By using a water-soluble organic solvent having an SP value of at least 9 $(cal/cm^3)^2$ the aqueous ink colorant aggregation action on the substrate can be reduced.

One of the water-soluble organic solvents described above may be used alone, or a combination of two or more such solvents may be used.

The amount of water-soluble organic solvent used as a penetrant, relative to the total mass of the second pretreatment liquid, is preferably at least 1% by mass, more preferably at least 10% by mass, and even more preferably 30% by mass or greater.

The amount of water-soluble organic solvent used as a penetrant, relative to the total mass of the second pretreatment liquid, is preferably not more than 100% by mass, more preferably not more than 80% by mass, and even more preferably 60% by mass or less. Because a water-soluble organic solvent used as a penetrant functions as both a penetrant and a solvent, the second pretreatment liquid may be composed of a single water-soluble organic solvent component that acts as a penetrant.

One of the penetrants described above may be used alone, or a combination of two or more penetrants may be used. In those cases where two or more penetrants are used, the two or more penetrants are preferably selected so as not to avoid mutual impairment of their actions, and the respective blend amounts are also preferably adjusted as appropriate. Further, the permeability of the second pretreatment liquid can be further improved by including a surfactant as the penetrant. Moreover, using a combination of a surfactant and a water-soluble organic solvent having an SP value of not more than 14 $(cal/cm^3)^{1/2}$ as the penetrant is preferred.

The amount of the penetrant, relative to the total mass of the second pretreatment liquid, is preferably at least 0.5% by mass, more preferably at least 10% by mass, and even more preferably 30% by mass or greater. In those cases where a surfactant is used as the penetrant, the permeability of the second pretreatment liquid can be effectively improved even with a small amount of the surfactant.

Although not a restriction, the amount of the penetrant, relative to the total mass of the second pretreatment liquid, is preferably not more than 100% by mass, more preferably not more than 80% by mass, and even more preferably 60% by mass or less.

For example, the amount of the penetrant, relative to the total mass of the second pretreatment liquid, is preferably within a range from 0.5 to 100% by mass, more preferably from 10 to 80% by mass, and even more preferably from 30 to 60% by mass.

The second pretreatment liquid may also contain water. For example, the second pretreatment liquid preferably contains water as the main solvent. There are no particular limitations on the water used, and examples include ion-exchanged water, distilled water, ultrapure water and deionized water.

Water is a solvent having high volatility and evaporates readily from the substrate following application to the substrate, and can therefore promote drying of the printed matter. Further, because water is harmless and safe, and suffers none of the problems associated with VOCs, the surface-treated substrate can be produced as an environmentally friendly product.

The amount of water, relative to the total mass of the second pretreatment liquid, is preferably within a range from 1 to 95% by mass, more preferably from 5 to 90% by mass, and may be from 10 to 80% by mass.

The second pretreatment liquid may contain a water-soluble organic solvent, either in combination with the water, or instead of the water.

Examples of water-soluble organic solvents that may be used include water-soluble organic solvents selected from among the penetrants described above. Further, the water-soluble organic solvents described below that may be added to the aqueous ink may also be used. A single water-soluble organic solvent may be used alone, or a combination of two or more water-soluble organic solvents may be used, and the water-soluble organic solvent preferably forms a single phase in a mixed solvent with water.

The amount of the water-soluble organic solvent, relative to the total mass of the second pretreatment liquid, is preferably within a range from 10 to 100% by mass, more preferably from 30 to 90% by mass, and may be from 50 to 80% by mass.

The total amount of the water and the water-soluble organic solvent, relative to the total mass of the second pretreatment liquid, is preferably within a range from 50 to 100% by mass, more preferably from 70 to 99% by mass, and may be from 80 to 98% by mass.

The second pretreatment liquid may also contain a binder resin. By including a binder resin, the fixability of the second pretreatment liquid to the substrate can be further enhanced. Further, the fixability of the aqueous ink to the substrate can be further enhanced.

Resins that do not cause aggregation of the colorant of the aqueous ink are preferred as the binder resin, and nonionic resins can be used favorably. The nonionic resin may be either water-soluble or water-dispersible. Further, a nonionic resin selected from among the resin components described below for addition to the aqueous ink may be used as the nonionic resin.

Further, in order to achieve crosslinking of the binder resin, the second pretreatment liquid may also contain a crosslinking component. The same crosslinking components as those described above in relation to the first pretreatment liquid may be used as the crosslinking component.

When a binder resin is added, from the viewpoints of the fixability and the stability within the printing apparatus, the amount of the binder resin, relative to the total mass of the second pretreatment liquid, is preferably within a range from 0.1 to 20% by mass, and more preferably from 1 to 10% by mass.

Further, when a crosslinking component is included, the amount of the crosslinking component, relative to the total mass of the second pretreatment liquid, is preferably within a range from 0.1 to 5% by mass, and more preferably from 1 to 3% by mass.

From the viewpoint of the back surface density, the second pretreatment liquid preferably does not contain a fixing resin. Fixing resins can cause a deterioration in the permeability, meaning the back surface density can sometimes decrease.

In a similar manner to the aqueous ink described below, the second pretreatment liquid may also contain optional components such as humectants, antifoaming agents, pH adjusters, antioxidants, preservatives, surface tension reducers and ultraviolet absorbers and the like, provided the effects of the present invention are not impaired.

There are no particular limitations on the method used for producing the second pretreatment liquid, and production may be performed using the same method as that described above for the first pretreatment liquid.

Aqueous Ink

The aqueous ink preferably contains a colorant and water.

Examples of the colorant include pigments and dyes, and a pigment or dye may be used alone, or a combination of the two may be used. From the viewpoint of the weather resistance and water resistance of the printed matter, a pigment is preferably used as the colorant.

A non-white pigment, a white pigment, or a combination thereof may be used as the pigment.

In those cases where a colored substrate or a substrate having surface texture such as a fabric is used as the substrate, a method may be used in which a base layer is first formed using a white ink that uses a white pigment in order to conceal the color or the like of the substrate, and an image is subsequently recorded on top of this white layer.

Examples of non-white pigments that may be used include organic pigments such as azo-based pigments, phthalocyanine-based pigments, dye-based pigments, condensed polycyclic pigments, nitro-based pigments and nitroso-based pigments (with specific examples including brilliant carmine 6B, lake red C, Watchung red, disazo yellow, Hansa yellow, phthalocyanine blue, phthalocyanine green, alkali blue and aniline black); inorganic pigments including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black.

Examples of white pigments that may be used include inorganic pigments such as titanium oxide, zinc oxide, zinc sulfide, antimony oxide and zirconium oxide. Besides inorganic pigments, hollow resin microparticles and dense resin microparticles may also be used. Among these, from the viewpoint of opacity, titanium oxide can be used particularly favorably. In order to suppress any photocatalytic action, titanium oxide that has been surface treated with alumina or silica is preferably used.

From the viewpoint of the color development properties, the volume average particle size of the pigment is preferably at least 50 nm, whereas from the viewpoint of the jetting stability, the average particle size is preferably not more than 500 nm, and more preferably 200 nm or less. For example, the average particle size of the pigment is preferably from 50 to 500 nm, and more preferably from 50 to 200 nm.

Self-dispersing pigments in which the pigment surface has been modified with hydrophilic functional groups may also be used. Examples of commercially available self-dispersing pigments include the CAB-O-JET series manufactured by Cabot Corporation (including CAB-O-JET 200, CAB-O-JET 300, CAB-O-JET 250C, CAB-O-JET 260 M and CAB-O-JET 270), and the products BONJET BLACK CW-1S, CW-1, CW-2 and CW-3 (all product names) manufactured by Orient Chemical industries, Ltd.

Microencapsulated pigments in which the pigment is coated with a resin may also be used.

Pigment dispersions in which the pigment has been dispersed in advance using a pigment dispersant may also be used. Examples of commercially available pigment dispersions include the HOSTAJET series manufactured by Clariant AG, and the FUJI SP series manufactured by Fuji Pigment Co., Ltd. (both product names). Pigment dispersions that have been dispersed using pigment dispersants described below may also be used.

One of the above pigments may be used alone, or a combination of two or more pigments may be used.

The amount of the pigment varies depending on the type of pigment, but from the viewpoints of color development and the like, the amount of the pigment, expressed as a solid fraction amount relative to the total mass of the aqueous ink, is preferably within a range from about 0.1 to 30% by mass, more preferably from 0.5 to 15% by mass, and even more preferably from 1 to 10% by mass.

In order to ensure stable dispersion of the pigment in the water, the aqueous ink may also contain a pigment dispersant.

Examples of commercially available pigment dispersants include the TEGO Dispers series manufactured by Evonik Industries AG (including TEGO Dispers 740W, TEGO Dispers 750W, TEGO Dispers 755W, TEGO Dispers 757W and TEGO Dispers 760W), the Solsperse series manufactured by The Lubrizol Corporation (including Solsperse 20000, Solsperse 27000, Solsperse 41000, Solsperse 41090, Solsperse 43000, Solsperse 44000 and Solsperse 46000), the Joncryl series manufactured by Johnson Polymer, Inc. (including Joncryl 57, Joncryl 60, Joncryl 62, Joncryl 63, Joncryl 71 and Joncryl 501), as well as DISPERBYK-102, DISPERBYK-185, DISPERBYK-190, DISPERBYK-193 and DISPERBYK-199 manufactured by BYK Additives & instruments GmbH (wherein all of the above represent product names).

Examples of surfactant-type dispersants that may be used include anionic surfactants such as the DEMOL, series manufactured by Kao Corporation (including DEMOL EP, DEMOL N, DEMOL RN, DEMOL NL, DEMOL RNL and DEMOL T-45 (all product names)), and nonionic surfactants such as the EMULGEN series manufactured by Kao Corporation (including EMULGEN A-60, EMULGEN A-90, EMULGEN A-500, EMULGEN B-40, EMULGEN L-40 and EMULGEN 420 (all product names)).

A single pigment dispersant may be used alone, or a combination of two or more pigment dispersants may be used.

There are no particular limitations on the amount of the pigment dispersant in the ink, which varies depending on the type of dispersant used, but generally, the amount of the pigment dispersant, expressed as a mass ratio of the solid fraction relative to a value of 1 for the pigment, is preferably within a range from 0.005 to 0.5.

In terms of dyes, any of the dyes typically used in the technical field of printing may be used without any particular limitations. Specific examples include basic dyes, acid dyes, direct dyes, soluble vat dyes, acid mordant dyes, mordant dyes, reactive dyes, vat dyes and sulfide dyes, and among these, water-soluble dyes and dyes that become water-soluble upon reduction or the like can be used. More specific examples of dyes that may be used include azo dyes, rhodamine dyes, methine dyes, azomethine dyes, xanthene dyes, quinone dyes, triphenylmethane dyes, diphenylmethane dyes, and methylene blue.

One of the above dyes may be used alone, or a combination of two or more dyes may be used.

The amount of the dye varies depending on the type of dye, but from the viewpoints of color development and the like, the amount of the dye, expressed as a solid fraction amount relative to the total mass of the aqueous ink, is preferably within a range from 0.1 to 30% by mass, more preferably from 0.5 to 15% (by mass, and even more preferably from 1 to 10% by mass.

The aqueous inkjet ink preferably contains water. There are no particular limitations on the water, provided it functions as a solvent for the ink, and examples of waters that may be used include distilled water, ion-exchanged water and deionized water.

The amount of water relative to the total mass of the ink is preferably at least 20% by mass, more preferably at least 30% by mass, and even more preferably 40% by mass or greater.

Depending on the amount added of the colorant and the like, the amount of water relative to the total mass of the ink may be not more than 95% by mass, or 90% by mass or less.

The ink may also contain a water-soluble organic solvent, either in addition to the water, or instead of the water. Organic compounds that are liquid at room temperature and soluble in or miscible with water may be used as the water-soluble organic solvent, and the use of a water-soluble organic solvent that mixes uniformly with an equal volume of water at one atmosphere and 20° C. is preferred.

Examples of water-soluble organic solvents that may be used include:

lower alcohols such as methanol, ethanol, 1-propanol, isopropanol, 1-butanol, 2-butanol, isobutanol, 1,3-propanediol, 1,3-butanediol, 1,2-butanediol, 1,2-pentanedial, 1,2-hexanediol and 2-methyl-2-propanol;

glycols such as ethylene glycol, diethylene glycol, triethylene glycol, tetraethylene glycol, pentaethylene glycol, propylene glycol; dipropylene glycol and tripropylene glycol;

glycerols such as glycerol, diglycerol, triglycerol and polyglycerol;

acetins such as monoacetin and diacetin;

glycol derivatives such as diethylene glycol monomethyl ether, diethylene glycol monobutyl ether, diethylene glycol dimethyl ether, diethylene glycol monoethyl ether, triethylene glycol monomethyl ether, triethylene glycol monoethyl ether, triethylene glycol monopropyl ether, triethylene glycol monobutyl ether, tripropylene glycol monobutyl ether, triethylene glycol monohexyl ether, tetraethylene glycol monomethyl ether, tetraethylene glycol monoethyl ether, tetraethylene glycol monobutyl ether, tetraethylene glycol dimethyl ether and tetraethylene glycol diethyl ether; and triethanolamine, 1-methyl-2-pyrrolidone, β-thiodiglycol and sulfolane.

Low-molecular weight polyalkylene glycols, including polyethylene glycols having an average molecular weight within a range from 190 to 630, such as an average molecular weight of 200, 300, 400 or 600, diol-type polypropylene glycols having an average molecular weight within a range from 200 to 600, such as an average molecular weight of 400, and triol-type polypropylene glycols having an average molecular weight within a range from 250 to 800, such as an average molecular weight of 300 or 700, may also be used as the water soluble organic solvent.

A single water-soluble organic solvent may be used alone, or a combination of two or more water-soluble organic solvents may be used. Further, among the water-soluble organic solvents described above, by using a water-soluble organic solvent having an SP value of not more than 14 $(cal/cm^3)^{1/2}$, the permeability of the aqueous ink into the substrate can be further improved. These types of water-soluble organic solvents having an SP value of not more than 14 $(cal/cm^3)^{1/2}$ are as described above in the section relating to the second pretreatment liquid.

The amount of the water-soluble organic solvent, relative to the total mass of the ink, is preferably within a range from 1 to 80% by mass, moreover preferably from 5 to 60% by mass, and may be from 10 to 50% by mass, or from 20 to 40% by mass. In those cases where two or more water-soluble organic solvents are added, the total amount of water-soluble organic solvent preferably satisfies this range.

The aqueous ink may also contain a surfactant.

Surfactants are broadly classified into ionic surfactants such as cationic surfactants, anionic surfactants and amphoteric surfactants, and nonionic surfactants. Further, the surfactant may be either a low-molecular weight surfactant or a polymer surfactant (generally indicating a molecular weight of about 2,000 or greater), but the use of a low-molecular weight surfactant is preferred. The HUB value of the surfactant is preferably within a range from 5 to 20.

By adding this surfactant, jetting the ink stably using an inkjet recording apparatus becomes easier, and penetration of the aqueous ink into the substrate can be controlled appropriately, both of which are desirable.

A nonionic surfactant can be used favorably as the surfactant. Further, a nonionic surfactant has little effect on the charge balance of the aqueous ink, meaning the dispersibility or solubility of the colorant can be favorably maintained.

The nonionic surfactants described above as penetrants for addition to each of the pretreatment liquids may be used as the nonionic surfactant.

Furthermore, by using an anionic surfactant as the surfactant, the surfactant can function as a pigment dispersant while also exhibiting a surfactant action. Examples of this type of anionic surfactant include the EMAL series (including EMAL 0, EMAL 10, EMAL 2F, EMAL 40 and EMAL 20C), the NEOPELEX series (including NEOPELEX GS, NEOPELEX G-15, NEOPELEX G-25 and NEOPELEX G-65), the PELEX series (including PELEX OT-P, PELEX TR, PELEX CS, PELEX TA, PELEX SS-L and PELEX SS-H), and the DEMOL series (including DEMOL N, DEMOL NL, DEMOL RN and DEMOL MS), wherein all of the above represent product names manufactured by Kao Corporation.

Moreover, depending on the type of colorant and the like, an amphoteric surfactant may also be used as the surfactant.

Examples of amphoteric surfactants include the AMPHITOL series manufactured by Kao Corporation (including AMPHITOL 20BS, AMPHITOL 24B AMPHITOL 86B, AMPHITOL 20YB and AMPHITOL 20N) (all product names).

The amount of the surfactant, expressed as the amount of the active ingredient relative to the total mass of the ink, is preferably at least 0.1% by mass, and more preferably 0.5% by mass or greater. On the other hand, the amount of the surfactant, expressed as the amount of the active ingredient relative to the total mass of the ink, is preferably not more than 5% by mass, more preferably not more than 4% by mass, and even more preferably 3% by mass or less.

The aqueous ink may also contain a water-dispersible resin, a water-soluble resin, or a combination thereof. By including at least one of a water-dispersible resin and a water-soluble resin in the ink the colorant can be satisfactorily fixed to the substrate, and therefore superior coloration can be achieved with a small amount of the colorant.

Examples of water-soluble resins include polyvinyl alcohol, polyacrylic acid, neutralized products of polyacrylic acid, acrylic acid/maleic acid copolymers, acrylic acid/sulfonic acid copolymers, and styrene/maleic acid copolymers. One of these resins may be used alone, or a combination of a plurality of resins may be used.

In the case of a water-dispersible resin, the use of negatively charged anionic resin particles in which the surfaces of the particles carry a minus charge is preferred. This enables the resin to be dispersed in water in particulate form without dissolving, thus forming an oil-in-water (O/W) emulsion. The water-dispersible resin may be a resin that has anionic functional groups on the particle surfaces, such as a self-emulsifying resin, or may be a resin that has been subjected to a surface treatment such as the adhering of an anionic dispersant to the surfaces of the resin particles. Representative examples of the anionic functional group include a carboxyl group and a sulfo group, and examples of the anionic dispersant include anionic surfactants and the like. When the surfaces of the resin particles are anionic, a chemical interaction occurs with the coagulant of the first pretreatment liquid, and as a result, the fixability of the colorant can be further strengthened, and the durability of the image can be further enhanced.

The surface charge of the anionic water-dispersible resin particles is preferably within a range from −20 to −500 µeq/g, and is more preferably from −20 to −100 µeq/g.

In terms of the type of water-dispersible resin, the use of a resin that forms a transparent coating film is preferred. Further, when producing the ink, the water-dispersible resin may be added in the form of a resin emulsion.

Representative examples of the water-dispersible resin include urethane resins, (meth)acrylic resins, styrene/(meth)acrylic resins, polyester resins, olefin resins, vinyl chloride resins, vinyl acetate resins, melamine resins, amide resins, ethylene-vinyl chloride copolymer resins, styrene-(meth)acrylic resins, styrene-maleic anhydride copolymer resins, vinyl acetate-(meth)acrylic copolymer resins, vinyl acetate-ethylene copolymer resins, silicone resins, and mixed resins of the above resins.

As described above, a negative charge can be imparted to these resins by introducing anionic functional groups into the resin, or by surface treating the resin with an anionic dispersant or the like.

Among these water-dispersible resins, from the viewpoints of achieving stable jetting performance from the recording head and superior fixability to the substrate, the use of a urethane resin having a glass transition temperature (Tg) within a range from −35 to 40° C. is preferred.

Examples of commercially available water-dispersible urethane resins include the products SUPERFLEX 460, 420, 470 and 460S (product names of carbonate-based urethane resin emulsions), 150HS (a product name of an ester-ether-based urethane resin emulsion), 740 (a product name of an aromatic isocyanate-based ester-based urethane resin emulsion), and 500 M (a product name of a non-yellowing isocyanate ester-based urethane resin emulsion), all manufactured by INKS Co., Ltd., and the products NeoRez R-9660 and R-2170 (product names of aliphatic polyester-based urethane resin emulsions), NeoRez R-966, R-967 and R-650 (product names of aliphatic polyether-based urethane resin emulsions) and R-986 and R-9603 (product names of aliphatic polycarbonates), all manufactured by DSM N.V.

Furthermore, from the viewpoint of the stability within the ink, the use of a (meth)acrylic resin or a (meth)acrylic resin copolymer is also preferred.

Examples of commercially available products of such resins include the products Mowinyl 6963 and 6960 (product names of acrylic resin emulsions), and Mowinyl 966A and 6969D (product names of styrene/acrylic resin emulsions), manufactured by The Nippon Synthetic Chemical Industry Co., Ltd., the products Joncryl 7100, PDX-7370 and PDX-7341 (product names of styrene/acrylic resin emulsions) manufactured by BASF Corporation, and the products VONCOAT EC-905EF, 5400E and CG-8400 (acrylic/styrene-based emulsions) manufactured by DIC Corporation.

The water-dispersible resin may be composed of a single type of resin such as a urethane resin or an acrylic resin, may be composed of a composite resin containing a combination of a plurality of resins, or may be a mixture of these resin emulsions.

Furthermore, in terms of minimizing the effect on the charge balance of the aqueous ink, a nonionic or amphoteric water-dispersible resin may be used as the water-dispersible resin. Examples of commercially available products of such resins include Mowinyl 7720 manufactured by The Nippon Synthetic Chemical Industry Co., Ltd., VONCOAT 40-418EF manufactured by DIC Corporation, HUX-895 and HUX-830 manufactured by ADEKA Corporation, and SUPERFLEX 500 M and SUPERFLEX E-4800 manufactured by DKS Co., Ltd. (wherein all of the above represent product names).

In the water-dispersible resin emulsion, the water-dispersible resin particles that form the emulsion should have a particle size appropriate for inkjet recording methods, and generally, the average particle size (the median size measured on a volume basis using a dynamic light scattering method) is preferably not more than 300 nm, more preferably not more than 200 nm, and even more preferably 150 nm or less. There are no particular limitations on the lower limit for the average particle size of the water-dispersible resin particles, but from the viewpoint of the storage stability of the ink, the average particle size is preferably at least 1 nm, more preferably at least 5 nm, and even more preferably 10 nm or greater.

The total amount of the water-soluble resin and the water-dispersible resin, expressed as a mass ratio of the solid fraction amount relative to a value of 1 for the colorant, is preferably within a range from 0.1 to 15, more preferably from 1 to 10, and even more preferably from 3 to 7. By ensuring the amount of resin satisfies this range, the fixability and image quality of the image printed onto the surface of the substrate can be ensured. Provided the mass of the resin is at least 0.1 relative to a value of 1 for the colorant, the fixability of the image can be further enhanced. By ensuring that the mass of the resin is not more than 15 relative to a value of 1 for the colorant, the stability of the aqueous ink within the printing apparatus can be further improved.

The total amount of the water-soluble resin and the water-dispersible resin, expressed as the solid fraction amount relative to the total mass of the aqueous ink, is preferably at least 0.1% by mass, more preferably at least 1% by mass, and even more preferably 5% by mass or greater.

Further, the total amount of the water-soluble resin and the water-dispersible resin, relative to the total mass of the aqueous ink, is preferably not more than 20% by mass, and even more preferably 10% by mass or less.

For example, the total amount of the water-soluble resin and the water-dispersible resin, relative to the total mass of the aqueous ink, is preferably within a range from 0.1 to 20% by mass, more preferably from 1 to 20% by mass, and may be from 5 to 10% by mass.

In order to achieve crosslinking of the resin component to strengthen the coating film and further enhance the fixability, the aqueous ink may also contain a crosslinking component. Examples of the crosslinking component include blocked isocyanates, oxazoline group-containing compounds, (poly) carbodiimides, aziridine, chelating agents, and silane coupling agents and the like.

The amount of the crosslinking component, relative to the total mass of the aqueous ink, is preferably within a range from 0.1 to 5% by mass, and more preferably from 1 to 3% by mass.

Besides the components described above, the ink may also contain optional components such as humectants, antifoaming agents, pH adjusters, antioxidants, preservatives, surface tension reducers and ultraviolet absorbers and the like, provided the effects of the present invention are not impaired.

There are no particular limitations on the method used for producing the ink, and production may be performed using an appropriate conventional method. For example, the ink may be prepared by dispersing all of the components in a conventional dispersion device such as a beads mill, either in a single batch or in a number of separate batches, and then, if required, passing the resulting dispersion through a conventional filtration device such as a membrane filter. In another example, the ink may be prepared by first preparing a mixed liquid by mixing together water and all of the colorant, and following dispersion of this mixed liquid using a dispersion device, adding the remaining components to the resulting dispersion and then performing filtering using a filtration device.

The viscosity of the aqueous ink may be adjusted as appropriate, but for example, from the viewpoint of the jetting properties, the viscosity at 23° C. is preferably within a range from 1 to 30 mPa·s.

From the viewpoint of the storage stability of the ink, the pH of the aqueous ink is preferably within a range from 7.0 to 10.0, and more preferably from 7.5 to 9.0.

An aqueous inkjet ink set of one embodiment contains the first pretreatment liquid containing a coagulant, the second pretreatment liquid that does not contain a coagulant but contains a penetrant, and the aqueous ink containing a colorant and water. Details regarding the first pretreatment liquid, the second pretreatment liquid and the aqueous ink are as described above.

A pretreatment liquid set for an aqueous inkjet ink according to one embodiment contains the first pretreatment liquid containing a coagulant, and the second pretreatment liquid that does not contain a coagulant but contains a penetrant. Details regarding the first pretreatment liquid and the second pretreatment liquid are as described above.

Recording Method

In a method for producing printed matter according to one embodiment, it is preferable that one of the first pretreatment liquid and the second pretreatment liquid, the other of the first pretreatment liquid and the second pretreatment liquid, and then the aqueous ink are applied in this order to a recording region of a substrate, wherein the first pretreatment liquid and the second pretreatment liquid are jetted so as to land on the substrate in a fixed order.

The first pretreatment liquid and the second pretreatment liquid are applied so that one of the two pretreatment liquids is applied first to the recording region, followed by the other pretreatment liquid. As a result, the coagulant of the first pretreatment liquid and the penetrant of the second pretreatment liquid are applied to the substrate in an overlapping arrangement, and the image quality and fixability of the printed matter can be improved. By ensuring that the layering order of the first pretreatment liquid and the second pretreatment liquid is the same across the entire surface of the substrate recording region, the aqueous ink does not undergo wet spreading from the landing site on the substrate, meaning image irregularities can be suppressed and the image density can be increased. Further, because the components of the first pretreatment liquid and the second pretreatment liquid are applied uniformly to the substrate, the compatibility between the aqueous ink and the surface that has been treated by the pretreatment liquids is improved, and the fixability can be further improved.

Further, in those cases where a type of pretreatment liquid containing both a coagulant and a penetrant is used, the pretreatment liquid may sometimes not penetrate sufficiently into the interior of the substrate. By applying the first pretreatment liquid and the second pretreatment liquid separately to the substrate, penetration of the pretreatment liquids into the interior of the substrate can be promoted, and the fixability to the substrate of the subsequently applied aqueous ink can be improved. Furthermore, by applying the first pretreatment liquid and the second pretreatment liquid separately to the substrate, the coagulant of the first pretreatment liquid is able to form a density gradient through the thickness direction of the substrate, enabling the image quality and fixability of the printed matter to be improved with good balance.

Further, by appropriate control of the ratio between the two pretreatment liquids in accordance with the substrate, the balance between the image quality and the fixability can be further improved. When only one type of pretreatment liquid is used, poor density caused by excessive penetration of the pretreatment liquid, or unsatisfactory fixability caused by insufficient penetration can sometimes occur.

In those cases where the first pretreatment liquid and the second pretreatment liquid are applied to the substrate in this order, the coagulant of the first pretreatment liquid that is applied first to the substrate is forced into the interior of the substrate by the penetrant and solvent of the second pretreatment liquid that is applied thereafter. As a result, excessive aggregation of the ink by the coagulant is suppressed, an excessive amount of the ink is not retained at the outermost surface of the substrate that is prone to the effects of external forces, and the fixability of the printed matter can be further improved.

Furthermore, in those cases where the second pretreatment liquid and the first pretreatment liquid are applied to the substrate in this order, the penetrant of the second pretreatment liquid is applied first to the substrate, and a portion of the coagulant of the first pretreatment liquid that is applied thereafter is retained at the substrate surface as the coagulant penetrates into the interior of the substrate. As a result, a comparatively large amount of the colorant of the aqueous ink aggregates and is retained near the surface of the substrate, enabling the image density of the printed matter to be enhanced. Further, by applying the second pretreatment liquid to the substrate first, the penetrant is able to permeate from the interior of the substrate right through to the back surface of the substrate, and the resulting priming effect enables the coagulant and the ink to permeate into the substrate interior. As a result, image irregularities can be further reduced. Furthermore, the rear surface density of the printed matter can be further enhanced, to enable use of the printed matter in applications that require visibility of the image from the back surface side of the substrate.

A method for applying the first pretreatment liquid, the second pretreatment liquid and then the aqueous ink in this order to the recording region of a substrate is described below. A method in which the second pretreatment liquid, the first pretreatment liquid and then the aqueous ink are applied in this order to the recording region of a substrate can be performed by reversing the configurations of the first pretreatment liquid and the second pretreatment liquid in the method described below, and therefore a detailed description of this reverse method is omitted.

The first pretreatment liquid and the second pretreatment liquid can be applied independently to the recording region of the substrate using an inkjet recording apparatus.

The first pretreatment liquid and the second pretreatment liquid are preferably applied independently to the region corresponding with the recording region for the aqueous ink. By not applying the first pretreatment liquid and the second pretreatment liquid to regions outside the recording region, wet spreading of the aqueous ink to portions outside of the recording region can be prevented, and bleeding of the image can be better prevented. Further, by not applying the first pretreatment liquid and the second pretreatment liquid to regions outside the recording region, any deterioration in the color or texture of the substrate surface in the portions outside of the recording region can be prevented. The first pretreatment liquid and the second pretreatment liquid may also be applied to regions outside of the recording region for the aqueous ink, and may be applied to a portion of the substrate including the recording region, or to the entire surface of the substrate.

Next, the aqueous ink may be applied, using an inkjet recording apparatus, to the recording region of the substrate that has been treated by the first pretreatment liquid and the second pretreatment liquid.

By performing application in this order, an image having the first pretreatment liquid, the second pretreatment liquid and the aqueous ink layered in this order can be recorded on the substrate.

The amounts applied of the first pretreatment liquid and the second pretreatment liquid each vary depending on the type of substrate used and the materials and the like, and can therefore not be uniformly prescribed, but in order to further improve the image quality and fixability, the amount applied per unit of applied surface area is preferably within a range from 1 $g/m^2$ to 100 $g/m^2$, more preferably from 3 $g/m^2$ to 50 $g/m^2$, and even more preferably from 5 $g/m^2$ to 30 $g/m^2$.

The amount applied of the aqueous ink varies depending on the type of substrate used and the materials and the like, and can therefore not be uniformly prescribed, but in order to increase the image density, the amount applied per unit of applied surface area is preferably within a range from 1 $g/m^2$ to 500 $g/m^2$, more preferably from 3 $g/m^2$ to 100 $g/m^2$, and even more preferably from 5 $g/m^2$ to 50 $g/m^2$.

By applying the first pretreatment liquid and the second pretreatment liquid separately to the substrate, the amount of volatile components such as water and solvents applied to the substrate increases, and therefore a fabric or the like that has the ability to retain water and the like can be used particularly favorably as the substrate.

By drying the substrate after application of the aqueous ink, volatile components such as water and solvents are removed, enabling the image to be fixed to the substrate. There are no particular limitations on the image recorded, and any arbitrary pattern, text, combination of patterns and text, solid image, or photographic image or the like may be used.

In order to obtain an image of high quality, printing conditions such as (i) reducing the size of the ink droplets, (ii) reducing the printing speed, (iii) performing unidirectional printing, (iv) increasing the print resolution, or (v) performing printing using a combination of these printing methods can be used effectively.

The applications of the first pretreatment liquid, the second pretreatment liquid and the aqueous ink to the substrate may each be performed using a typical inkjet recording apparatus, and there are no particular limitations on the recording system or the recording apparatus or the like.

The inkjet recording apparatus may use any of various systems, including a piezo system, electrostatic system or thermal system or the like, and a system that is capable of jetting liquid droplets of the ink or the like from the recording head based on a digital signal, and causing the jetted liquid droplets to land on the substrate to record an image is preferred. From the viewpoint of enabling jetting even in the case of an ink having high viscosity, a piezo system is preferred.

For example, by using an inkjet recording apparatus having at least three recording heads, the first pretreatment liquid, the second pretreatment liquid and the aqueous ink can be jetted from the respective heads and applied to the substrate to record an image. Furthermore, it is preferable that the first pretreatment liquid, the second pretreatment liquid and the aqueous ink are jetted from the respective heads and applied to the substrate to record an image while the substrate is transported once.

The applications of the first pretreatment liquid, the second pretreatment liquid and the aqueous ink to the substrate may each be performed using a typical recording head. For example, a serial-type inkjet recording apparatus fitted with a serial-type recording head, or a line head-type inkjet recording apparatus fitted with a line head-type recording head may be used.

When the first pretreatment liquid containing a coagulant is used, if the nozzle portion for jetting the first pretreatment liquid and the nozzle portion for jetting the aqueous ink are positioned close to each other, then although there is no problem in a configuration in which only the nozzle portion for jetting the aqueous ink is provided, the nozzle portion for jetting the first pretreatment liquid generates a mist containing the coagulant, and this mist can sometimes adhere to the nozzle portion for jetting the aqueous ink. As a result, the aqueous ink may sometimes aggregate within the nozzle section, causing nozzle blockages that can result in jetting faults. In a line head-type inkjet recording apparatus, even if one nozzle in the linear nozzle array misfires, the effect on the image is significant. Accordingly, in those cases where the first pretreatment liquid containing a coagulant is used, the use of a serial-type inkjet recording apparatus is preferred.

Further, in a line head-type inkjet recording apparatus, depending on the substrate and the performance required, reversing the arrangement of the recording heads for applying the first pretreatment liquid and the second pretreatment liquid can be difficult. A serial-type inkjet recording apparatus can control the application order of the first pretreatment liquid and the second pretreatment liquid, and can therefore be used favorably.

In those cases where two or more pretreatment liquids are applied to the substrate, the total amount of the two or more pretreatment liquids and the aqueous ink applied to the substrate per unit of time is preferably controlled. If the total amount applied of these liquids becomes too great in a short period of time, then there is a possibility that penetration of the later applied pretreatment liquid and aqueous ink may become slower. For example, if the timing for the application of the first pretreatment liquid and the timing for the application of the second pretreatment liquid are substantially simultaneous, then penetration of both the first pretreatment liquid and the second pretreatment liquid into the substrate slows, and there is a possibility that the coagulant and the penetrant may be retained in a mixed state at the substrate surface. Further, depending on the combination of the first pretreatment liquid and the second pretreatment liquid, penetration into the substrate may be slowed even further. If the aqueous ink is then applied before the two pretreatment liquids have penetrated satisfactorily into the substrate, then the aqueous ink begins to aggregate at the substrate surface, and the fixability of the image can sometimes deteriorate. Accordingly, when using two or more pretreatment liquids, in order to enable the application interval between each of the pretreatment liquids to be more easily adjusted, a serial-type inkjet recording apparatus is preferably used rather than a line head-type inkjet recording apparatus.

For example, the application interval from application of the first pretreatment liquid until application of the second pretreatment liquid differs depending on the types and amounts and the like of the volatile components contained in each of the pretreatment liquids, but is preferably at least 1 ms (millisecond), and more preferably 10 ms or longer. This enables the second pretreatment liquid to be applied after the first pretreatment liquid has already started to penetrate into the substrate, meaning retention of the two pretreatment liquids on the substrate surface can be prevented.

On the other hand, the application interval from application of the first pretreatment liquid until application of the second pretreatment liquid is preferably not more than 10 s (seconds), and more preferably not more than 1 s. This ensures that the second pretreatment liquid is applied before the first pretreatment liquid dries on the substrate, which enables the coagulant of the first pretreatment liquid to penetrate further into the interior of the substrate.

The application interval from application of the second pretreatment liquid until application of the aqueous ink differs depending on the types and amounts and the like of the volatile components contained in each of the pretreatment liquids and the aqueous ink, but is preferably at least 10 ms, and more preferably at least 100 ms, and even more preferably 1 s or longer. This enables the aqueous ink to be applied after the second pretreatment liquid has already penetrated adequately into the substrate, which enables the aqueous ink to better penetrate into the interior of the substrate.

On the other hand, the application interval from application of the second pretreatment liquid until application of the aqueous ink is preferably not more than 100 s, and more preferably not more than 10 s. This ensures that the aqueous ink is applied before the first pretreatment liquid and the second pretreatment liquid dry on the substrate, which enables the aqueous ink to better penetrate into the interior of the substrate.

In those cases where a serial-type inkjet recording apparatus is used, by controlling the movement speed of the recording head in the main scanning direction, the application interval between the first pretreatment liquid and the second pretreatment liquid, and the application interval between the second pretreatment liquid and the aqueous ink can be more easily adjusted. This also applies in the case where the application order of the first pretreatment liquid and the second pretreatment liquid is different.

Further, by using a recording head unit illustrated in FIG. 2 described below, the application interval between the second pretreatment liquid and the aqueous ink can be adjusted to a longer interval. Furthermore, by using a recording head unit illustrated in FIG. 3 described below, both the application interval between the second pretreatment liquid and the aqueous ink, and the application interval between the first pretreatment liquid and the second pretreatment liquid can be adjusted to longer intervals.

In one embodiment, it is preferable that for the pretreatment liquid that lands on the substrate first among the first pretreatment liquid and the second pretreatment liquid, at least one of the landing time difference $\Delta T_X$ between the two dots for which the distance between the dots in the main scanning direction reaches a shortest value, and the landing time difference $\Delta T_Y$ between the two dots for which the distance between the dots in a direction that intersects the main scanning direction reaches a shortest value, is at least 10 ms. In the following description, the landing time difference $\Delta T_X$ and the landing time difference $\Delta T_Y$ are also jointly referred to as the landing time difference $\Delta T$.

By ensuring that the above condition is satisfied, the permeability of the two pretreatment liquids can be improved, an anchoring effect can be more easily obtained for the ink coating film, and the fixability of the image can be improved.

In this description, the "main scanning direction" (hereafter also referred to as the "main scanning direction X") is the direction along which dots are jetted continuously, and is the main scanning direction of the recording head in a serial system, or the lengthwise direction of the recording head in a line head system. Furthermore, a "direction that intersects the main scanning direction" (hereafter also referred to as a "direction Y") may be any direction that intersects the main scanning direction along which dots are jetted continuously, and may be a direction that intersects the main scanning direction perpendicularly, or a direction that intersects the main scanning direction at an angle other than a right angle. In a typical inkjet recording apparatus, the substrate is transported in a direction orthogonal to the main scanning direction X, and therefore the two dots for which the distance between the dots reaches a shortest value land on the substrate along a direction orthogonal to the main scanning direction X.

If the pretreatment liquid that lands on the substrate first among the first pretreatment liquid and the second pretreatment liquid is termed the pretreatment liquid E, then among the dots of the pretreatment liquid E, if the two dots for which the distance between the dots in the main scanning direction reaches a shortest value are termed the dot $E_{X1}$ and the dot $E_{X2}$, then the landing time difference between the dot $E_{X1}$ and the dot $E_{X2}$ is the landing time difference $\Delta T_X$. Further, among the dots of the pretreatment liquid E, if the two dots for which the distance between the dots in a direction that intersects the main scanning direction reaches a shortest value are termed the dot $E_{Y1}$ and the dot $E_{Y2}$, then the landing time difference between the dot $E_{Y1}$ and the dot $E_{Y2}$ is the landing time difference $\Delta T_Y$. It is preferable that at least one of the landing time difference $\Delta T_X$ and the landing time difference $\Delta T_Y$ for the pretreatment liquid E, namely the landing time difference $\Delta T_X$, the landing time difference $\Delta T_Y$, or both the landing time difference $\Delta T_X$ and the landing time difference $\Delta T_Y$, is at least 10 ms.

In those cases where a pretreatment liquid contains a resin component, the resin tends to exhibit poor permeability, and for example, water-dispersible resins tend to permeate poorly in particulate form, whereas water-soluble resins thicken upon volatilization of the water component and tend to lose permeability. However, in those cases where the pretreatment liquid that lands on the substrate first among the two pretreatment liquids contains a resin, by ensuring that the landing time difference $\Delta T$ is at least 10 ms, the permeability of the two pretreatment liquids can be enhanced even when using a pretreatment liquid containing a resin.

The landing time difference $\Delta T$ is preferably at least 10 ms, more preferably at least 20 ms, and even more preferably 100 ms or greater.

On the other hand, the landing time difference $\Delta T$ is preferably not longer than 30 s, more preferably not longer than 5 s, and even more preferably 3 s or less. If the landing time difference $\Delta T$ exceeds 30 s, then drying and/or film formation of the pretreatment liquid that lands on the substrate may sometimes start, and the permeability may deteriorate.

For example, the landing time difference $\Delta T$ is preferably within a range from 10 ms to 5 s, and more preferably from 20 ms to 3 s.

At least one of the landing time differences $\Delta T_X$ and $\Delta T_Y$ may be at least 10 ms, or both may be at least 10 ms. The preferred range for each of the landing time differences $\Delta T_X$ and $\Delta T_Y$ is the same as that described above for $\Delta T$.

There are no particular limitations on the method used for ensuring that the landing time differences $\Delta T$ is at least 10 ms, but for example, a serial-type inkjet recording apparatus may be used.

When jetting is performed using a serial-type recording head, for example, the landing time difference $\Delta T_X$ between the two dots for which the distance between the dots in the main scanning direction X reaches a shortest value may be set to at least 10 ms. In this case, the value of $\Delta T_X$ can be adjusted to at least 10 ms, for example, by controlling the movement speed of the serial-type recording head along the main scanning direction X. Alternatively, the value of $\Delta T_X$ can be adjusted to at least 10 ms by ensuring at least a prescribed distance between landing positions along the main scanning direction X of the serial-type recording head. Moreover, a combination of these methods may also be used.

Furthermore, when jetting is performed using a serial-type recording head, for example, the landing time difference $\Delta T_Y$ between the two dots for which the distance between the dots in a direction Y that intersects the main scanning direction reaches a shortest value may be set to at least 10 ms. In this case, for example, by using a serial-type inkjet recording apparatus in which the substrate is transported in a direction orthogonal to the main scanning direction, the landing time difference $\Delta T_Y$ can be adjusted to a value of at least 10 ms by controlling the transport speed of the substrate and the movement speed of the recording head and the like, during the process of jetting the pretreatment liquid along a first line while the serial-type recording head is scanned across the main scanning direction X, subsequently moving the substrate a distance of one line in the transport direction, and then jetting a second line of the pretreatment liquid onto the substrate in a similar manner to the first line.

The landing time difference $\Delta T_X$ and the landing time difference $\Delta T_Y$ described above may be controlled individually, or in combination.

A specific method for producing printed matter using a serial-type inkjet recording apparatus is described below.

A serial-type inkjet recording apparatus contains a serial-type recording head with nozzle portions that is fitted so as to be able to move along the main scanning direction (hereafter also referred to as the main scanning direction X), and a transport device that transports the substrate to a position facing the recording head. By repeating an operation in which ink is jetted from the nozzle portions while the serial-type recording head is moved along the main scanning direction X, and an operation in which the substrate is moved in a transport direction (hereafter also referred to as the transport direction Y) that intersects the main scanning direction, an image can be recorded on the substrate.

One example of a serial-type inkjet recording apparatus contains a recording head unit that can be moved along the main scanning direction X, and a transport device that transports the substrate in the transport direction Y. The recording head unit contains at least a first recording head, a second recording head and a third recording head. The recording head unit can be moved back and forth along the main scanning direction X by a drive belt. One of the first pretreatment liquid and the second pretreatment liquid is supplied to the first recording head, the other of the first pretreatment liquid and the second pretreatment liquid is supplied to the second recording head, and the aqueous ink is supplied to the third recording head, so that each of the first pretreatment liquid, the second pretreatment liquid and the aqueous ink can be jetted from the respective recording head. By using this configuration, the three liquids can be layered on the substrate to record an image.

The substrate transport device may be a device in which the recording head unit is fixed to the inkjet recording apparatus, and a transport roller or the like is used to move the substrate along the transport direction Y so as to pass a position facing the recording heads. Alternatively, the substrate transport device may be a device in which the substrate is fixed and mounted to a mounting section, and the recording head unit is moved so that the substrate is moved relatively in the transport direction Y. It is preferable that the substrate is transported in a direction orthogonal to the main scanning direction of the recording head unit.

Further, the recording apparatus may also contain a heating device for heating the substrate at an arbitrary stage during printing, or before or after printing. By heating the substrate with the heating device, drying of each of the pretreatment liquids and the aqueous ink that have been applied to the substrate can be accelerated. Further, in those cases where the pretreatment liquid or aqueous ink contains a resin component, formation of a resin film can also be promoted.

Furthermore, the recording apparatus may also contain an input device for inputting the image data that is to be printed. The input device may include an external input unit for receiving image data from a scanner or a computer. Based on this image data, jetting of the aqueous ink from the recording head can be controlled, and each of the pretreatment liquids can be jetted in advance onto the recording region onto which the aqueous ink is to be jetted.

A serial-type inkjet recording apparatus according to one embodiment has, for example, a serial-type recording head unit containing a first recording head to which one of the first pretreatment liquid and the second pretreatment liquid is supplied, a second recording head to which the other of the first pretreatment liquid and the second pretreatment liquid is supplied, and a third recording head to which the aqueous ink is supplied. Using this recording apparatus, application of one of the first pretreatment liquid and the second pretreatment liquid from the first recording head to the recording region of the substrate, application of the other of the first pretreatment liquid and the second pretreatment liquid from the second recording head to the recording region of the substrate, and application of the aqueous ink from the third recording head to the recording region of the substrate can be performed in this order. By using this recording apparatus, one of the first pretreatment liquid and the second pretreatment liquid, the other of the first pretreatment liquid and the second pretreatment liquid, and the aqueous ink are layered on the substrate in this order, and the first pretreatment liquid and the second pretreatment liquid land on the substrate in a fixed order, enabling printed matter having a recorded image to be obtained.

In one specific method, the first recording head, the second recording head and the third recording head are positioned in this order along the main scanning direction of the recording head unit, and one of the first pretreatment liquid and the second pretreatment liquid is jetted from the first recording head, the other of the first pretreatment liquid and the second pretreatment liquid is jetted from the second recording head, and the aqueous ink is jetted from the third recording head, thereby applying the three liquids to the recording region of the substrate in this order, while the recording head unit is moved in one direction along the main scanning direction.

FIG. 1 is a top view schematically illustrating one example of a serial-type recording head unit according to one embodiment.

In the recording head unit 100 illustrated in FIG. 1, a first recording head 11, a second recording head 12 and a third recording head 13 are disposed in this order in a linear arrangement along the main scanning direction X from the downstream side of the outward path (from left to right in the drawing, this convention also applies below). The third recording head 13 contains four recording heads composed of a black recording head 13K, a cyan recording head 13C, a magenta recording head 13M and a yellow recording head 13Y, which are used for jetting the four aqueous ink colors of black (K), cyan (C), magenta (M) and yellow (Y) respectively. This description also applies to FIG. 2 and FIG. 3 described below.

The first pretreatment liquid is supplied to the first recording head 11, the second pretreatment liquid is supplied to the second recording head 12, the aqueous inks are supplied to the third recording head 13, and by jetting the first pretreatment liquid from the first recording head 11, jetting the second pretreatment liquid from the second recording head 12, and jetting the aqueous inks from the third recording head 13, while the recording head unit 100 is moved in the outward path direction along the main scanning direction X, the first pretreatment liquid, the second pretreatment liquid and the aqueous inks can be applied to the substrate in this order.

With this configuration of the recording head unit 100, this application order applies only for the outward path along the main scanning direction X, and the application order reverses along the return path. Accordingly, in order to achieve the above application order, printing is preferably performed with application performed only on the outward path, and no application performed on the return path.

In this method, because application occurs only on the outward path, with no application on the return path, a landing time difference between dots of at least 10 ms can be achieved between adjacent lines in the transport direction Y. Accordingly, at least the landing time difference $\Delta T_Y$ can be controlled to a value of at least 10 ms.

In another specific method, the first recording head and the second recording head are disposed in a linear arrangement along the main scanning direction of the recording head unit, and the third recording head is positioned downstream in the substrate transport direction from the first recording head and the second recording head, and application of one of the first pretreatment liquid and the second pretreatment liquid from the first recording head to the recording region of the substrate and application of the other of the first pretreatment liquid and the second pretreatment liquid from the second recording head to the recording region of the substrate are performed in this order, the substrate is then moved along the substrate transport direction relative to the recording head unit, and application of the aqueous ink from the third recording head to the recording region of the substrate that has already been treated with the first pretreatment liquid and the second pretreatment liquid may then be performed.

Figure 2:
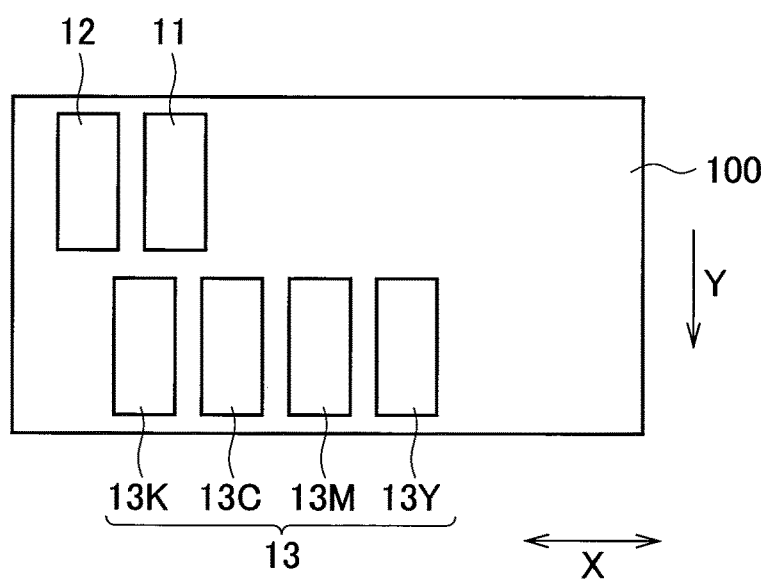
FIG. 2 is a top view schematically illustrating another example of a serial-type recording head unit.

FIG. 2 is a top view schematically illustrating another example of a serial-type recording head unit according to one embodiment.

In FIG. 2, the recording head unit 100 includes a first head array containing a first recording head 11 to which the first pretreatment liquid is supplied and a second recording head 12 to which the second pretreatment liquid is supplied arranged along the main scanning direction X of the recording head unit 100, and a second head array containing a third recording head 13 to which the aqueous inks are supplied disposed downstream from the first head array in the substrate transport direction Y.

By repeating an operation in which the first pretreatment liquid is jetted from the first recording head 11 and the second pretreatment liquid is jetted from the second recording head 12, and an operation in which the substrate is moved in the transport direction Y, and the aqueous inks are then jetted from the third recording head 13 onto the recording region on the substrate to which the first pretreatment liquid and the second pretreatment liquid have been applied, while the recording head unit 100 is moved along the main scanning direction X, the first pretreatment liquid, the second pretreatment liquid and the aqueous inks can be applied to the substrate in this order.

By using this type of arrangement, the mist containing the coagulant of the first pretreatment liquid can be prevented from adhering to the nozzles jetting the aqueous inks. As a result, nozzle blockages in the third recording head 13 can be better prevented.

With this configuration of the recording head unit 100, this application order applies only for the outward path along the main scanning direction X (left to right in the drawing), and the application order reverses along the return path. Accordingly, in order to achieve the above application order, printing is preferably performed with application performed only on the outward path, and no application performed on the return path.

In this method, because application occurs only on the outward path, with no application on the return path, a landing time difference between dots of at least 10 ms can be achieved between adjacent lines in the transport direction Y. Accordingly, in this method, at least the landing time difference $\Delta T_Y$ can be controlled to a value of at least 10 ms.

Figure 3:
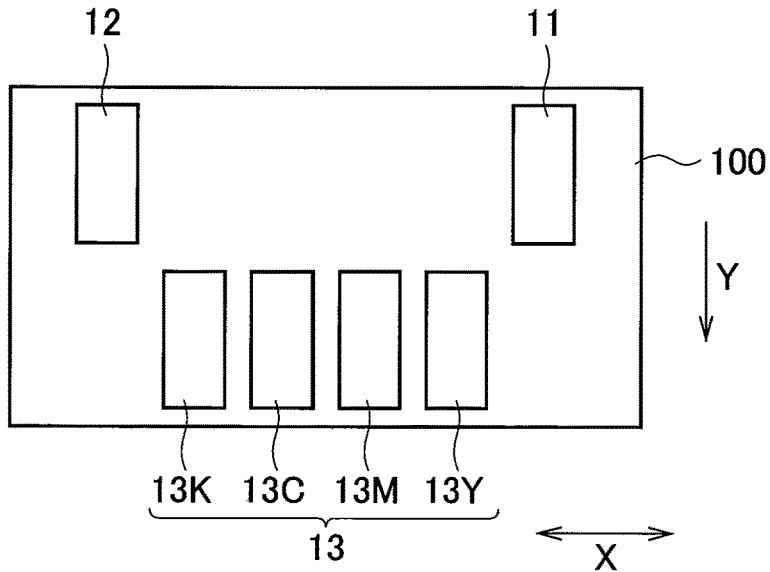
FIG. 3 is a top view schematically illustrating yet another example of a serial-type recording head unit.

FIG. 3 is a top view schematically illustrating yet another example of a serial-type recording head unit according to one embodiment.

FIG. 3 illustrates an example in which the arrangement of the first recording head 11 and the second recording head 12 differs from that illustrated above in FIG. 2. In FIG. 3, the first recording head 11 and the second recording head 12 are arranged distant from each other. The first recording head 11 and the second recording head 12 are preferably separated by at least the width of one recording head, and are more preferably separated by at least the width of two recording heads. More specifically, the first recording head 11 is positioned at one side of the recording head unit 100 in the main scanning direction X, and the second recording head 12 is positioned at the other side of the recording head unit in the main scanning direction X. It is more preferable that the first recording head 11 and the second recording head 12 are disposed so as not to overlap in the transport direction Y with the third recording head 13 that jets the aqueous inks.

By using this type of arrangement, the mist containing the coagulant of the first pretreatment liquid can be prevented from adhering to the nozzles jetting the second pretreatment liquid and the nozzles jetting the aqueous inks. As a result, nozzle blockages in the second recording head 12 and the third recording head 13 can be better prevented.

Further, in this method, in a similar manner to that described above for the apparatus of FIG. 2, because application occurs only on the outward path, with no application occurring on the return path, at least the landing time difference $\Delta T_Y$ can be controlled to a value of at least 10 ms.

In the recording head units illustrated in FIG. 1 to FIG. 3, in order to reverse the application order for the first pretreatment liquid and the second pretreatment liquid, the second pretreatment liquid may be supplied to the first recording head 11, and the first pretreatment liquid may be supplied to the second recording head 12.

In those cases where jetting is performed on both the outward path and the return path of a serial-type recording head unit, if a conventional recording method is used, then the jetting order for the two pretreatment liquids and the aqueous inks reverse between the outward path and the return path of the recording head unit, and therefore the layering order for the two pretreatment liquids on the substrate is reversed for each adjacent line in the transport direction Y of the substrate. An explanatory diagram for describing this conventional recording method is illustrated in FIG. 4.

Figure 4:
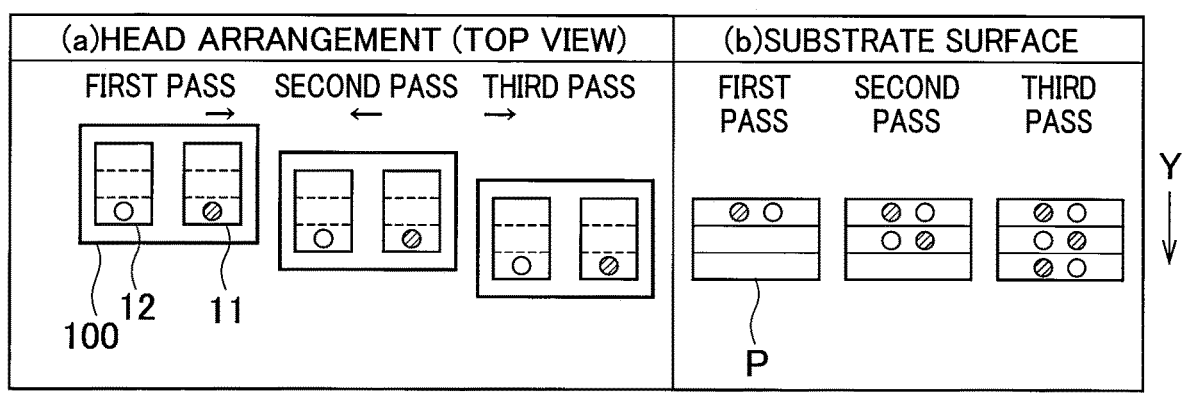
FIG. 4 is an explanatory diagram describing a recording method of a conventional example using a serial-type recording head unit.

In FIG. 4, (a) illustrates the arrangement of the recording head unit 100 from the top view, and for each pass, the case where the first pretreatment liquid is jetted from the first recording head 11 is indicated with a hatched circle, and the case where the second pretreatment liquid is jetted from the second recording head 12 is indicated by a white circle. Further, (b) illustrates the surface of a substrate P from the top view, and for each line along the main scanning direction of the recording head unit 100, those cases where the first pretreatment liquid and the second pretreatment liquid are layered in this order are indicated by a hatched circle and then a white circle in this order from the left side of the drawing, whereas those cases where the opposite layering occurs are indicated by a white circle and then a hatched circle in this order from the left side of the drawing.

In FIG. 4, as illustrated in (a) in the drawing, in the first pass along the outward path, because the first recording head 11 moves ahead of the second recording head 12, the first pretreatment liquid is jetted onto the substrate first, followed by the second pretreatment liquid. Accordingly, as illustrated in (b) in the drawing, the first pretreatment liquid and the second pretreatment liquid are layered in this order on top of the substrate.

In the second pass along the return path, because the second recording head 12 moves ahead of the first recording head 11, the second pretreatment liquid is jetted onto the substrate first, followed by the first pretreatment liquid, and the second pretreatment liquid and the first pretreatment liquid are layered in this order on top of the substrate.

In the third pass in the outward direction, in the same manner as the first pass, the first pretreatment liquid and the second pretreatment liquid are layered in this order on top of the substrate.

In the obtained printed matter, the layering order of the two pretreatment liquids reverses in each adjacent line in the substrate transport direction. In a substrate that has been treated in this manner with two pretreatment liquids, the aggregation of the colorant of the aqueous ink on the substrate lacks uniformity, the permeability of the aqueous ink into the substrate also lacks uniformity, and the fixability of the image of the printed matter can sometimes deteriorate.

In a recording method according to one embodiment, it is preferable that the first recording head is provided on the downstream side of the outward path along the main scanning direction X of the recording head unit and the second recording head is provided on the upstream side, and when the recording head unit is moved along the outward path, the first pretreatment liquid is first jetted from the first recording head, and the second pretreatment liquid is then jetted from the second recording head, whereas when the recording head unit is moved along the return path, neither the first pretreatment liquid nor the second pretreatment liquid is jetted. As a result, the first pretreatment liquid and the second pretreatment liquid can be layered in this order across the entire surface of the substrate recording region. In other words, in FIG. 4, it is preferable that only the jetting of the first pass along the outward path is repeated, while no jetting is performed on the second pass along the return path. Alternatively, in FIG. 4, by not performing jetting during the first pass and the third pass along the outward path, and repeating only the jetting performed during the second pass along the return path, the second pretreatment liquid and the first pretreatment liquid may be layered in this order on the substrate.

In those cases where the recording head units 100 illustrated in FIG. 2 and FIG. 3 are used, once the first pretreatment liquid and the second pretreatment liquid have been layered onto the substrate, the substrate may be transported so that the third recording head 13 reaches the position facing the region to which each of the pretreatment liquids has been applied, and an image may then be recorded by jetting the aqueous inks from the third recording head 13.

Furthermore, a serial-type inkjet recording apparatus may also be used to apply the first pretreatment liquid and the second pretreatment liquid along both the outward path and the return path. This method enables the productivity to be enhanced compared with the case where the first pretreatment liquid and the second pretreatment liquid are jetted only during one of the outward path and the return path of the main scanning direction, and are not jetted in the other direction. In the following description, there are no particular limitations on the order of movement along the outward path and the return path of the main scanning direction, and the outward path and the return path may occur in the reverse order. Further, in the following description, the application order for the first pretreatment liquid and the second pretreatment liquid may be reversed.

One example of a bidirectional recording method is a method that uses a recording head unit in which a first recording head and second recording head are arranged along the main scanning direction X, wherein the first pretreatment liquid is applied to the substrate from the first recording head during the outward path along the main scanning direction, and then during the return path along the main scanning direction, the second pretreatment liquid is applied to the substrate from the second recording head so as to overlap the first pretreatment liquid applied during the outward path.

In the example illustrated in FIG. 1, the recording head unit may then be moved again along the outward path of the main scanning direction while the aqueous inks are applied to the substrate from the third recording head so as to overlap the second pretreatment liquid. In the examples illustrated in FIG. 2 and FIG. 3, following application of the second pretreatment liquid, the substrate is moved in the transport direction Y, and the aqueous inks may be applied from the third recording head so as to overlap the second pretreatment liquid, while the recording head unit is moved again along the main scanning direction.

In another example of a bidirectional recording method, a recording head unit is used in which a first recording head is disposed on the upstream side in the substrate transport direction Y and a second recording head is disposed downstream of the first recording head, wherein during the outward path along the main scanning direction X, the first pretreatment liquid is applied to the substrate from the first recording head, the substrate is then moved in the transport direction, and during the return path along the main scanning direction, the second pretreatment liquid is applied to the substrate from the second recording head so as to overlap the first pretreatment liquid.

In order to enable more efficient application of the two pretreatment liquids, during the return path along the main scanning direction, while the second pretreatment liquid is applied to the substrate from the second recording head, the first pretreatment liquid may also be applied to the substrate from the first recording head. Similarly, during the outward path along the main scanning direction, while the first pretreatment liquid is applied to the substrate from the first recording head, the second pretreatment liquid may also be applied to the substrate from the second recording head.

In a configuration in which the first recording head and the second recording head are arranged along the transport direction, by using a recording head unit in which a third recording head is disposed further downstream in the transport direction from the second recording head, once the second pretreatment liquid has been applied, the substrate may be moved in the transport direction, and aqueous inks then applied to the substrate from the third recording head, so as to overlap the second pretreatment liquid, while the recording head unit is moved along the main scanning direction.

In yet another example of a bidirectional recording method, a recording head unit may be used in which a first recording head and a second recording head are arranged along the main scanning direction X, and in each of the first recording head and the second recording head, a plurality of nozzles are formed in an array along the substrate transport direction Y. By moving this recording head unit back and forth across the main scanning direction while the substrate is moved along the transport direction, the first pretreatment liquid is applied to the substrate from the nozzles of the first recording head on the upstream side in the transport direction to form a plurality of lines, the substrate is moved consecutively along the transport direction, and the second pretreatment liquid is applied from the nozzles of the second recording head on the downstream side in the transport direction so as to overlap the first pretreatment liquid previously applied by the upstream nozzles of the first recording head, thus enabling the formation of a plurality of lines having the first pretreatment liquid and the second pretreatment liquid layered in this order.

In the example illustrated in FIG. 1, by using a third recording head in which a plurality of nozzles are formed in an array along the transport direction, aqueous inks can be applied to the substrate from nozzles of the third recording head that are positioned even further downstream in the transport direction than the nozzles of the second recording head, thereby overlapping with the second pretreatment liquid applied from nozzles positioned further upstream in the transport direction.

In the examples illustrated in FIG. 2 and FIG. 3, the second pretreatment liquid is applied, the substrate is then moved in the transport direction Y, and the aqueous inks can then be applied from the third recording head so as to overlap with the second pretreatment liquid, while the recording head unit is moved across the main scanning direction.

In one specific method, in any of the recording head units illustrated in FIG. 1 to FIG. 3, by using a configuration in which a plurality of nozzles are formed in an array along the substrate transport direction Y for each of the first recording head 11 and the second recording head 12, bidirectional application can be performed. In each of the recording heads, the plurality of nozzles are arranged with mutual separation along the transport direction Y.

First, the recording head unit 100 is moved along the outward path of the main scanning direction X while liquid droplets of the first pretreatment liquid, each corresponding with a single dot, are jetted from one nozzle of the first recording head 11 at the upstream side in the substrate transport direction Y, thereby causing consecutive landing of dots along the main scanning direction X to form a line of the first pretreatment liquid with a width of one dot. Subsequently, the substrate is moved in the transport direction Y, and liquid droplets are jetted from one nozzle that is adjacent to, and on the downstream side in the transport direction Y relative to, the above one nozzle of the first recording head 11, thereby so as to land on the substrate adjacent to, and on the upstream side in the substrate transport direction Y relative to, the previously formed line of the first pretreatment liquid, and forming another line of the first pretreatment liquid in the same manner as the above line of the first pretreatment liquid. At this time, the landing time difference $\Delta T_Y$ on the substrate between two dots that are adjacent in the substrate transport direction Y can be adjusted to a value of at least 10 ms by controlling the time taken to move the substrate in the transport direction Y, and the movement speed of the recording head unit and the like.

Further, of the plurality of nozzles of the first recording head, two or more nozzles positioned consecutively along the transport direction Y may be used to apply two or more lines of the first pretreatment liquid in a single pass, with the lines separated by a distance corresponding with the spacing between the nozzles in the transport direction Y, and then, in a similar manner to that described above, apply additional lines of the first pretreatment liquid on the upstream side in the substrate transport direction Y of the previously formed lines of the first pretreatment liquid. In this method, the amount of image recording that can be conducted in a single pass of the recording head unit can be increased, enabling the productivity to be further enhanced.

Subsequently, the second pretreatment liquid may be jetted from the nozzles of the second recording head 12 and onto the substrate to form dots that overlap with the dots of the first pretreatment liquid that have already landed on the substrate.

For example, for a recording region of one-line width, the first pretreatment liquid is applied by jetting from a nozzle of the first recording head 11 on the upstream side in the substrate transport direction Y, the substrate is then moved in the transport direction Y, and the second pretreatment liquid may be applied by jetting from a nozzle of the second recording head 12 that is positioned on the downstream side in the substrate transport direction Y relative to the position of the above nozzle of the first recording head 11.

Next, in the example illustrated in FIG. 1, a third recording head having a plurality of nozzles formed in an array along the transport direction is used, the substrate is transported in the substrate transport direction Y, and aqueous inks can be jetted from nozzles of the third recording head that are positioned even further downstream in the transport direction than the above nozzles of the second recording head, with the aqueous inks landing on the substrate and forming dots that overlap the previously formed dots of the overlapped first pretreatment liquid and second pretreatment liquid.

In the examples illustrated in FIG. 2 and FIG. 3, the substrate is transported in the substrate transport direction Y, and aqueous inks can be jetted from the third recording head 13 so as to land on the substrate and form dots that overlap the previously formed dots of the overlapped first pretreatment liquid and second pretreatment liquid.

By repeating the operations described above, the first pretreatment liquid, the second pretreatment liquid and the aqueous inks can be applied to the substrate in this order, and the first pretreatment liquid and the second pretreatment liquid are able to land on the substrate in a fixed order.

In the bidirectional printing described above, in those cases where images having a resolution that is N times that of the resolution of the recording head are to be recorded, N lines may be formed in the region corresponding with the spacing between adjacent nozzles in the substrate transport direction Y. Here, N represents a positive integer.

Specifically, when images of 1200 dpi are to be recorded using a 300 dpi recording head, four dots can be formed in the region corresponding with the spacing between adjacent nozzles of the recording head in the substrate transport direction Y. Accordingly, four lines can be formed in the region corresponding with the spacing between adjacent nozzles in the substrate transport direction Y.

The line head-type inkjet recording method may use a line head-type recording head, which is positioned across a width direction of the substrate that intersects, and is preferably orthogonal to, the substrate transport direction, and is provided with an array of a plurality of nozzles across the substrate width direction.

One example of a line head-type inkjet recording apparatus contains a transport device that transports the substrate along the transport direction Y, and at least three recording heads that are disposed in a linear arrangement along a direction X that intersects the substrate transport direction Y. These at least three recording heads include, in this order from the upstream side along the substrate transport direction Y, a first recording head to which the first pretreatment liquid is supplied, a second recording head to which the second pretreatment liquid is supplied, and a third recording head to which the aqueous inks are supplied. By jetting the first pretreatment liquid, the second pretreatment liquid and the aqueous inks from the respective nozzle arrays, images can be recorded in which these three liquids are layered on the substrate in this order.

In a line head-type inkjet recording apparatus, by determining the alignment order of the recording heads to which the two pretreatment liquids and the aqueous inks are supplied, the order in which the two pretreatment liquids and the aqueous inks are applied to the substrate can be determined.

Further, the second pretreatment liquid may also be supplied to the first recording head and the first pretreatment liquid supplied to the second recording head, so that the application order of the first pretreatment liquid and the second pretreatment liquid is reversed.

In a line head-type inkjet recording method, the landing time difference $\Delta T_Y$ between two dots that are adjacent in the substrate transport direction Y can be adjusted to a value of at least 10 ms by controlling the jetting interval from the recording head, and the substrate transport time and the like.

The substrate having the applied aqueous ink may be provided without further modification as printed matter.

The substrate may be subjected to a heat treatment following application of the aqueous ink. This removes volatile components such a water contained in the aqueous ink, the first pretreatment liquid and the second pretreatment liquid from the substrate, and can enhance the fixability of the image. Further, by removing the volatile components before the colorant of the aqueous ink can undergo wet spreading, bleeding of the colorant can be prevented, and the image quality can be further enhanced. Further, in those cases where a resin component is included in the aqueous ink, heating enables the resin component of the aqueous ink to form a more uniform resin film on the substrate, thereby further improving the fixability.

The heating temperature is preferably within a range from 50 to 250° C., and more preferably from 100 to 200° C.

In order to ensure that the coagulant of the first pretreatment liquid is caused to penetrate into the substrate by the second pretreatment liquid before the coagulant dries and becomes fixed to the substrate surface, the second pretreatment liquid is preferably applied in a state where a heat treatment has not been conducted prior to the application of the second pretreatment liquid, so that the substrate is still wet with the first pretreatment liquid.

However, the substrate may also be subjected to a heat treatment following application of the first pretreatment liquid and prior to the application of the second pretreatment liquid.

Furthermore, in order to ensure better manifestation of the action of the second pretreatment liquid in causing the colorant of the aqueous ink to penetrate into the substrate, the aqueous ink is preferably applied in a state where a heat treatment has not been conducted prior to the application of the aqueous ink, so that the substrate is still wet from application of the first pretreatment liquid and the second pretreatment liquid. However, the substrate may also be subjected to a heat treatment following application of the first pretreatment liquid and the second pretreatment liquid, prior to the application of the aqueous ink.

For example, application of the first pretreatment liquid, the second pretreatment liquid and the aqueous ink is preferably performed using a wet-on-wet method. By applying the two pretreatment liquids using a wet-on-wet method, the second pretreatment liquid can be jetted onto the substrate in a state where the pretreatment liquid that landed on the substrate first has not dried and retains fluidity. Accordingly, the pretreatment liquid that landed on the substrate first can be forced to penetrate more readily into the interior of the substrate. As a result, the density at the back surface can be enhanced, and the fixability can be further improved due to an anchoring effect.

Furthermore, the same applies in the case where the second pretreatment liquid and the first pretreatment liquid are applied to the substrate in this order.

Second Embodiment

A second embodiment is described below.

The second embodiment may have the configurations described below.

[1] A method for producing a printed textile matter that includes a first step of applying a first pretreatment liquid containing at least water and an ink coagulant to a fabric, a second step of applying a second pretreatment liquid having a smaller ink aggregation force than the first pretreatment liquid to the fabric, and a third step of performing inkjet printing to the fabric using an aqueous inkjet ink.

[2] The second pretreatment liquid preferably either contains an ink coagulant that does not impart an ink aggregation force greater than that of the first pretreatment liquid, or does not contain an ink coagulant.

[3] The first pretreatment liquid preferably contains from 1 to 20% by mass of the ink coagulant relative to the total mass of the first pretreatment liquid.

[4] The amount applied of the second pretreatment liquid per unit of surface area is preferably within a range from 0.5 to 15 $g/m^2$.

In one embodiment, two pretreatment liquids having different ink aggregation forces are used, namely a first pretreatment liquid having a high ink aggregation force and a second pretreatment liquid having an ink aggregation force lower than that of the first pretreatment liquid. The first pretreatment liquid is used for treating the surface of the fabric in the first step, and the second pretreatment liquid is used in the second step for further treating the surface of the fabric that has already been treated with the first pretreatment liquid in the first step.

The first pretreatment liquid typically contains water and an ink coagulant. Unless specifically described below, each of the components contained in the first pretreatment liquid may use the same components as those described above for the first pretreatment liquid of the first embodiment. Further, other components may also be added to the first pretreatment liquid, in a similar manner to that described above for the first pretreatment liquid of the first embodiment.

There are no particular limitations on the second pretreatment liquid, provided the ink aggregation force is lower than that of the first pretreatment liquid, and examples include liquids containing an ink coagulant that does not impart an ink aggregation force greater than that of the first pretreatment liquid, and liquids that contain absolutely no ink coagulant and therefore have no ink aggregation force. More specifically, examples of liquids that may be used as the second pretreatment liquid include liquids containing at least water and an ink coagulant, wherein the ink coagulant is the same as the ink coagulant contained in the first pretreatment liquid, but the amount of the ink coagulant is less than the amount contained in the first pretreatment liquid, and liquids that do not contain an ink coagulant, but rather contain water and other components as required.

Examples of compounds that may be used as the ink coagulant include the same components as those used in the first pretreatment liquid described above in the first embodiment. The total amount of the ink coagulant in the second pretreatment liquid, relative to the total mass of the second pretreatment liquid, is preferably not more than 10% by mass, more preferably not more than 5% by mass, even more preferably not more than 1% by mass, and particularly preferably 0.1% by mass or less, but is limited to an amount lower than the amount that yields an ink aggregation force similar to that of the first pretreatment liquid used in the embodiment.

Specifically, the second pretreatment liquid may contain water and an ink coagulant. The second pretreatment liquid may also contain other components. Unless specifically described otherwise, each of the components added to the second pretreatment liquid may use the same components as the first pretreatment liquid. The components added to the first pretreatment liquid and the second pretreatment liquid may be the same or different.

The aqueous inkjet ink used in one embodiment is composed mainly of an aqueous medium and a colorant, and may also contain other components as required. Unless specifically described otherwise, each of the components added to the aqueous inkjet ink may use the same components as the aqueous ink described above for the first embodiment. Furthermore, other components may also be added to the aqueous inkjet ink, in a similar manner to that described above for the aqueous ink of the first embodiment.

In one embodiment, the first step, the second step and the third step are preferably performed in this order. The first step and the second step may be performed consecutively with no other step interposed therebetween, or a drying step of drying the first pretreatment liquid applied to the fabric in the first step may be performed before performing the second step. The second step and the third step may be performed consecutively with no other step interposed therebetween, or a drying step of drying the second pretreatment liquid applied to the fabric in the second step, or drying the first and second pretreatment liquids applied in the first and second steps, may be performed before performing the third step.

Application of the first pretreatment liquid and second pretreatment liquid to the fabric may be performed by applying each pretreatment liquid to the surface of the fabric using a coating or printing method or the like, and specifically, application of the pretreatment liquids may be performed using a coating device such as a brush, roller, bar coater, blade coater, die coater, roll coater, or air knife coater, or may be achieved by printing an image using a printing method such as inkjet printing, gravure printing or flexographic printing.

The inkjet printing using an aqueous inkjet ink in the third step may be performed using a typical inkjet printer.

Accordingly, the method for producing a printed textile matter according to one embodiment may be conducted, for example, by using an inkjet printer to consecutively jet the first pretreatment liquid onto the surface of the fabric using an inkjet printing method, subsequently jet the second pretreatment liquid using an inkjet printing method so as to overlap the first pretreatment liquid, and then jet the aqueous inkjet ink using an inkjet printing method so as to overlap pretreatment liquids.

The coating amount of the first pretreatment liquid per unit of surface area is preferably within a range from 0.1 to 100 $g/m^2$, and more preferably from 1 to 50 $g/m^2$. The coating amount of the second pretreatment liquid per unit of surface area is preferably not more than 15 g/m², and is more preferably from 0.5 to 15 g/m². Provided the coating amount of the second pretreatment liquid falls within this range, the colorant of the ink is not retained at the fabric surface, but rather penetrates onto the fabric interior, but that penetration into the fabric interior is suitably controlled, enabling a printed image having both favorable color development and rub fastness to be obtained.

In one embodiment, printed textile matters can be produced using all manner of fabrics as the substrate. Examples of preferred substrate include natural fibers and chemical fibers, and specific examples include cotton and polyester.

EXAMPLES

One embodiment is described below in further detail based on a series of examples, but one embodiment is not limited to only these examples. If no specific description is provided, then for those components that include a solvent or the like within the component, the blend amount shown in the table represents the total amount of the component including the solvent or the like.

Test Example 1

Production of Coagulant Liquids and Penetrant Liquids

Table 1 and Table 2 show the formulations of coagulant liquids for the first pretreatment liquid and penetrant liquids for the second pretreatment liquid. The components were premixed using the blend proportions shown in the tables, and each mixture was then stirred at 100 rpm for 30 minutes using a Mix Rotor. Subsequently, each of the mixtures was filtered through a nylon syringe filter with a pore diameter of 5 μm to obtain a series of coagulant liquids and penetrant liquids.

Production of Aqueous Inks

The formulations of a series of aqueous inks are shown in Table 3. The components were premixed using the blend proportions shown in the table, and each mixture was then stirred at 100 rpm for 30 minutes using a Mix Rotor. Subsequently, each mixture was filtered through a nylon syringe filter with a pore diameter of 5 μm to obtain an aqueous ink.

TABLE 1

Formulations of Coagulant Liquids

| | Units: % by mass | Active ingredient | Coagulant liquid 1 | Coagulant liquid 2 | Coagulant liquid 3 | Coagulant liquid 4 |
|---|---|---|---|---|---|---|
| Coagulant | Lactic acid | 90% | 11.1 | — | — | — |
| | PrintRite DP-375 | 32% | — | 21.9 | — | — |
| | Calcium chloride | — | — | 3.0 | 10.0 | — |
| | SHALLOL DC-303P | 41% | — | — | — | 17.1 |
| Penetrant | Dipropylene glycol | — | — | — | 10.0 | — |
| | 1,2-butanediol | — | — | — | — | — |
| | Diethylene glycol monoethyl ether | — | — | — | — | — |
| | OLFINE E1010 | — | 1.0 | 1.0 | — | — |
| | SILFACE SAG503A | — | — | — | 1.0 | — |
| | SILFACE SAG002 | — | — | — | — | 0.5 |
| Solvent | Diethylene glycol | — | 10.0 | 10.0 | — | 10.0 |
| | Ion-exchanged water | — | 77.9 | 64.1 | 79.0 | 72.4 |
| | Total (% by mass) | — | 100.0 | 100.0 | 100.0 | 100.0 |

TABLE 2

Formulations of Penetrant Liquids

| | Units: % by mass | Active ingredient | Penetrant liquid 1 | Penetrant liquid 2 | Penetrant liquid 3 | Penetrant liquid 4 |
|---|---|---|---|---|---|---|
| Coagulant | Lactic acid | 90% | — | — | — | — |
| | PrintRite DP-375 | 32% | — | — | — | — |
| | Calcium chloride | — | — | — | — | — |
| | SHALLOL DC-303P | 41% | — | — | — | — |
| Penetrant | Dipropylene glycol | — | 30.0 | — | 30.0 | — |
| | 1,2-butanediol | — | — | 15.0 | — | — |
| | Diethylene glycol monoethyl ether | — | — | — | — | 100.0 |
| | OLFINE E1010 | — | — | — | 3.0 | — |
| | SILFACE SAG503A | — | 3.0 | — | — | — |
| | SILFACE SAG002 | — | — | 3.0 | — | — |
| Solvent | Diethylene glycol | — | — | 15.0 | — | — |
| | Ion-exchanged water | — | 67.0 | 67.0 | 67.0 | — |
| | Total (% by mass) | — | 100.0 | 100.0 | 100.0 | 100.0 |

TABLE 3

Formulations of Aqueous Inks

| Units: % by mass | Active ingredient | Ink 1 | Ink 2 |
|---|---|---|---|
| CAB-O-JET 300 | 15% | 20.0 | 20.0 |
| SUPERFLEX 740 | 40% | 16.9 | — |
| Mowinyl 966A | 45% | — | 17.8 |
| TAKENATE WB3936 | 36% | 3.3 | 3.3 |
| Glycerol | — | 20.0 | — |
| Ethylene glycol | — | — | 20.0 |
| OLFINE E1010 | — | 0.5 | 0.5 |
| Ion-exchanged water | — | 39.3 | 38.4 |
| Total (% by mass) | | 100.0 | 100.0 |

The raw materials used were as follows.

Coagulants

Lactic acid: an organic acid

PrintRite DP-375: cationic water-dispersible resin particles, manufactured by The Lubrizol Corporation, active ingredient content: 32% by mass Calcium chloride: a polyvalent metal salt SHALLOL DC-303P: a cationic water-soluble resin, manufactured by DKS Co., Ltd., active ingredient content: 41%

Penetrants

Dipropylene glycol: manufactured by FUJIFILM Wako Pure Chemical Corporation, boiling point: 231° C.

1,2-butanediol manufactured by Tokyo Chemical Industry Co., Ltd., boiling point: 194° C.

Diethylene glycol monoethyl ether: manufactured by Tokyo Chemical Industry Co., Ltd., boiling point: 194° C.

OLFINE E1010 (product name): an acetylene glycol-based surfactant, manufactured by Nissin Chemical Industry Co., Ltd.

SILFACE SAG503A (product name): a silicon-based surfactant, manufactured by Nissin Chemical Industry Co., Ltd.

SILFACE SAG002 (product name) a silicon-based surfactant, manufactured by Nissin Chemical Industry Co., Ltd.

Solvent

Diethylene glycol: manufactured by FUJIFILM Wako Pure Chemical Corporation, boiling point: 245° C.

Aqueous Ink Components

CAB-O-JET 300 (product name): a self-dispersing pigment, manufactured by Cabot Corporation, active ingredient: 15% by mass SUPERFLEX 740 (product name): an anionic urethane resin emulsion, manufactured by DKS Co. Ltd., active ingredient: 40% by mass Mowinyl 966A (product name): a styrene/acrylic resin emulsion, manufactured by The Nippon Synthetic Chemical Industry Co., Ltd., active ingredient: 45% by mass TAKENATE WB3936 (product name): an isocyanate-based crosslinking agent, manufactured by Mitsui Chemicals, Inc., active ingredient: 36% by mass Glycerol: manufactured by Wako Pure Chemical Industries, Ltd., boiling point: 290° C.

Ethylene glycol: manufactured by Wako Pure Chemical Industries, Ltd., boiling point: 197.3° C.

Production of Printed Matter

Using the combinations of penetrant liquids, coagulant liquids and aqueous inks shown in Table 4, printing was performed in accordance with the following procedure to obtain printed matter.

A 100% polyester woven fabric was used as the substrate.

A serial-type inkjet printer that used recording heads having a resolution of 300 dpi was used as the printer. The positional arrangement within the serial-type recording head unit was as illustrated in FIG. 2. In FIG. 2, the coagulant liquid was supplied to the first recording head 11, the penetrant liquid was supplied to the second recording head 12, and the aqueous ink was supplied to the black recording head 13K of the third recording head.

In Examples 1 to 11, a penetrant liquid, a coagulant liquid and an aqueous ink were applied to a substrate in this order, thus producing printed matter.

Specifically, using a 300 dpi recording head, the penetrant liquid, the coagulant liquid and the aqueous ink were each jetted onto the substrate by bidirectional printing at 1200 dpi×1200 dpi to print a single-color solid image of 200 mm×200 mm. A movement of one line in the transport direction Y of the substrate was set to correspond with a resolution of 1,200 dpi in the transport direction (one quarter of the distance between nozzles). Further, for the penetrant liquid, the landing time difference $\Delta T_Y$ on the substrate between adjacent lines in the substrate transport direction Y was at least 10 ms.

Further, in each of the first recording head 11, the second recording head 12, and the third recording head 13, a plurality of nozzles were formed along the substrate transport direction Y. The second recording head 12 jets the penetrant liquid from consecutive nozzles at the upstream side in the transport direction Y, and by repeatedly moving the recording head unit back and forth across the main scanning direction X and transporting the substrate, the penetrant liquid is jetted onto the substrate so as to form four lines within the distance separating adjacent nozzles in the transport direction Y.

During this process, if the nozzles are labeled nozzle a, nozzle b and nozzle c from the upstream side in the transport direction Y, then a first line of the penetrant liquid was formed from each of these nozzles during the outward path along the main scanning direction X. Subsequently, the substrate was transported, and a second line was formed by jetting the penetrant onto the substrate from the nozzle b on the return path across the main scanning direction X, with this second line being formed adjacently on the upstream side in the transport direction Y of the first line of the penetrant that had been previously jetted from the nozzle a. During formation of this second line, the penetrant liquid was also jetted with the same spacing from the nozzle a and the nozzle c. By repeating this operation, four lines of the penetrant liquid were formed in positions corresponding with a resolution of 1,200 dpi in the substrate transport direction Y. The description here described only a small number of nozzles, but during actual use, the same operation is performed across all of the nozzles of the second recording head 12.

The substrate is then transported consecutively in the transport direction Y, and when the region having the four lines of the penetrant liquid formed thereon reaches a position facing the nozzles of the first recording head 11 on the downstream side in the transport direction Y of the above nozzles of the second recording head 12, the coagulant liquid is jetted onto the substrate from the first recording head 11, while the recording head unit is moved back and forth across the main scanning direction and the substrate is moved, so that the coagulant liquid overlaps the four lines of the previously jetted penetrant liquid, thereby forming four lines in which the penetrant liquid and the coagulant liquid have been layered in this order. The jetting method for the coagulant liquid is the same as that described above for the penetrant liquid.

The substrate is then transported further in the transport direction Y, and when the region having the four lines composed of the layered penetrant liquid and coagulant liquid formed thereon reaches a position facing the third recording head 13 that is positioned on the downstream side in the transport direction Y, the aqueous ink is jetted from the third recording head 13 while the recording head unit is moved across the main scanning direction, thereby layering the penetrant liquid, the coagulant liquid and the aqueous ink in this order and forming an image.

In Examples 12 and 13, the coagulant liquid, the penetrant liquid and the aqueous ink were applied to the substrate in this order to produce printed matter. More specifically, with the exception of reversing the application order for the penetrant liquid and the coagulant liquid from the above Examples 1 to 11, the same procedure as that described above was used to form solid images having a resolution of 1,200 dpi. The landing time difference $\Delta T_Y$ between adjacent lines in the substrate transport direction Y for the coagulant liquid on the substrate, was at least 10 ms.

In Comparative Example 1, only the aqueous ink 1 was applied to the substrate.

In Comparative Example 2, only the coagulant liquid 1 was applied before the aqueous ink 1 was applied.

In Comparative Example 3, the coagulant liquid 2, the coagulant liquid 3 and the aqueous ink 1 were applied to the substrate in this order to produce printed matter.

In Comparative Example 4, only the penetrant liquid 1 was applied before the aqueous ink 1 was applied.

In Comparative Examples 1, 2 and 4, by using the method described above for Examples 1 to 11, but not applying either both or one of the penetrant liquid and the coagulant liquid, solid images having a resolution of 1,200 dpi were formed.

In Comparative Example 3, with the exception of using two different coagulant liquids instead of a combination of a penetrant liquid and a coagulant liquid, the same procedure as that described above for Examples 1 to 11 was used to form a solid image having a resolution of 1,200 dpi.

In Comparative Example 5, using the conventional jetting method illustrated in FIG. 4, printed matter was produced by applying the coagulant liquid, the penetrant liquid and the aqueous ink in this order on the outward path, but applying the penetrant liquid, the coagulant liquid and the aqueous ink in this order on the return path.

In the printed matter of Comparative Example 5, the layering order of the coagulant liquid and the penetrant liquid differed between the outward path and the return path, with the aqueous ink then being applied on top.

Following printing of each item of printed matter, the printed matter was heat pressed at 180° C. for one minute.

In all of the printed matter described above, the coagulant liquid and the penetrant liquid were both applied to a region corresponding with the recording region for the aqueous ink.

Further, the amount applied of the penetrant liquid per unit of surface area was set to 20 g/m², the amount applied of the coagulant liquid per unit of surface area was set to 20 and the amount applied of the aqueous ink per unit of surface area was set to 20 g/m².

Evaluations

The obtained printed matter was subjected to the following evaluations. The results are shown in Table 4.

Image Quality

The surface of the obtained printed matter was inspected visually and the surface OD value of the printed matter was measured, and the image quality was evaluated against the following criteria. The OD value was measured using an X-Rite eXact device manufactured by Videojet X-Rite K.K.

AA: no irregularities visible on printed matter surface, and the surface OD value is 1.30 or higher.

A: no irregularities visible on printed matter surface, and the surface OD value is 1.25 or higher.

B: few irregularities on printed matter surface, and the surface OD value is higher than 1.20.

C: significant irregularities on minted matter surface, or the surface OD value is 1.20 or less.

Fixability

A type-II rubbing tester was used to test the printed matter in accordance with the method prescribed in JIS L0849, Dry rubbing was performed in accordance with the dry test prescribed in JIS L0849, and a soiling grayscale was used to evaluate the fixability against the following criteria.

AA: dry rubbing soiling of grade 3 or higher

A: dry rubbing soiling of grade 2 to 3

B: dry rubbing soiling of grade 2

C: dry rubbing soiling of less than grade 2

Back Surface Density

The back surface OD value of the printed matter was measured, and the back surface density was evaluated against the following criteria. The OD value was measured using the same device as that described above for the image quality evaluation.

Printed matter having a high back surface OD value exhibits excellent visibility of the image from the back surface, and is therefore a preferred state in the case of printing to fabric.

AA: back surface OD value of 0.40 or higher

A: back surface OD value of 0.35 or higher

B: back surface OD value of 0.30 or higher

C: back surface OD value of less than 0.30

TABLE 4

Evaluation Results for Examples and Comparative Examples

| Printing order | Example 1 | Example 2 | Example 3 | Example 4 | Example 5 | Example 6 | Example 7 | Example 8 |
|---|---|---|---|---|---|---|---|---|
| First | penetrant liquid 1 | penetrant liquid 1 | penetrant liquid 2 | penetrant liquid 1 | penetrant liquid 1 | penetrant liquid 1 | penetrant liquid 2 | penetrant liquid 2 |
| Second | coagulant liquid 1 | coagulant liquid 1 | coagulant liquid 1 | coagulant liquid 2 | coagulant liquid 3 | coagulant liquid 4 | coagulant liquid 2 | coagulant liquid 3 |
| Third | Ink 1 | Ink 2 | Ink 1 | Ink 1 | Ink 1 | Ink 1 | Ink 1 | Ink 1 |
| Image quality | AA | AA | AA | AA | AA | AA | AA | AA |
| Fixability | AA | AA | AA | AA | A | A | AA | A |
| Back surface density | AA | AA | AA | A | AA | AA | A | AA |

| Printing order | Example 9 | Example 10 | Example 11 | Example 12 | Example 13 |
|---|---|---|---|---|---|
| First | penetrant liquid 3 | penetrant liquid 4 | penetrant liquid 3 | coagulant liquid 1 | coagulant liquid 3 |
| Second | coagulant liquid 1 | coagulant liquid 1 | coagulant liquid 3 | penetrant liquid 1 | penetrant liquid 3 |
| Third | Ink 1 | Ink 1 | Ink 1 | Ink 1 | Ink 1 |
| Image quality | AA | AA | AA | A | A |
| Fixability | A | A | B | AA | A |
| Back surface density | A | A | A | A | B |

| Printing order | Comparative Example 1 | Comparative Example 2 | Comparative Example 3 | Comparative Example 4 | Comparative Example 5 |
|---|---|---|---|---|---|
| First | Ink 1 | coagulant liquid 1 | coagulant liquid 2 | penetrant liquid 1 | Random penetrant liquid 1 |
| Second | — | Ink 1 | coagulant liquid 3 | Ink 1 | coagulant liquid 1 |
| Third | — | — | Ink 1 | — | Ink 1 |
| Image quality | C | B | B | C | C |
| Fixability | A | C | C | A | C |
| Back surface density | C | C | C | B | B |

As shown in the above table, by using the recording method employed in each of the examples, printed matter having favorable image quality and fixability as well as satisfactory back surface density can be produced.

In Examples 1 to 3, an organic acid was included in the coagulant liquid and a silicon-based surfactant was included in the penetrant liquid, and even better results were obtained for the fixability and the back surface density.

Based on Examples 1 to 8, it was evident that by including lactic acid in the coagulant liquid, even better results could be obtained for the fixability and the back surface density Based on Examples 1 to 8, it was evident that by including lactic acid or cationic resin particles in the coagulant liquid, the fixability was able to be further improved.

Based on Examples 1 to 8, it was evident that in those cases where cationic resin particles were not included in the coagulant liquid, printed matter having higher back surface density could be obtained.

In Example 9, the penetrant liquid included an acetylene glycol-based surfactant. In Example 10, the penetrant liquid was composed solely of a single component of diethylene glycol monoethyl ether. In Example 11, the penetrant liquid was the same as that of Example 9, and the coagulant liquid was the same as Examples 5 and 8. In each case, favorable results were obtained.

Example 12 is an example in which the application order for the penetrant liquid and the coagulant liquid was reversed from the order used in Example 1. Example 13 is an example in which the application order for the penetrant liquid and the coagulant liquid was reversed from the order used in Example 11. In each case, favorable results were obtained. By applying the penetrant liquid first and then the coagulant liquid, as in Examples 1 and 11, better results were obtained for the image quality and the back surface density.

In Comparative Example 1, the aqueous ink was applied without performing any pretreatment, and satisfactory results could not be obtained for the image quality or the back surface density.

In Comparative Example 2, only a single coagulant liquid was applied. In Comparative Example 3, only two types of coagulant liquid were applied. In Comparative Example 4, only a single penetrant liquid was applied. In each case, because a combination of a penetrant liquid and a coagulant liquid was not applied, satisfactory results could not be obtained.

In Comparative Example 5, the application order for the penetrant liquid and the coagulant liquid was reversed between the pass of the recording head along the outward path and the pass of the recording head along the return path. In the resulting printed matter, it is thought that because the layering order of the penetrant liquid and the coagulant liquid was reversed for each line corresponding with a pass of the recording head, the coagulant component and the penetrant component were unable to form a uniform layer, resulting in a deterioration in the image quality and the fixability.

Test Example 2

Production of Ink

Raw materials were mixed together in the blend ratio shown in Table 5, and following mixing, the mixture was filtered through a 0.8 μm cellulose acetate membrane filter to remove coarse particles and obtain an evaluation ink.

TABLE 5

| Raw material | Compound or product name | Ink 2-1 |
| --- | --- | --- |
| Black pigment dispersion | BONJET BLACK CW-1S | 30.0 |
| Fixing resin | SUPERFLEX 470 | 13.2 |
| Surfactant | OLFINE E1020 | 0.5 |
| Water-soluble organic solvent | Diethylene glycol | 20.0 |
| Water | Ion-exchanged water | 36.3 |
| Total (% by mass) | | 100.0 |

The raw materials shown in the table were as follows.

BONJET BLACK CW-1S (product name): a 15% carbon black-containing self-dispersing pigment, manufactured by Orient Chemical Industries, Ltd.

SUPERFLEX 470 (product name): a urethane resin emulsion, manufactured by DKS Co. Ltd., active ingredient content: 38% by mass OLFINE E1020 (product name): an acetylene glycol-based surfactant, manufactured by Nissin Chemical Industry Co., Ltd.

Diethylene glycol: a water-soluble organic solvent, manufactured by FUJIFILM Wako Pure Chemical Corporation

Production of Pretreatment Liquids

Raw materials were mixed together in the blend ratios shown in Table 6, and following mixing, each mixture was filtered through a 0.8 μm cellulose acetate membrane filter to remove coarse particles and obtain a pretreatment liquid. The ink aggregation force of each of the pretreatment liquids containing a coagulant was evaluated by placing 10 mL of the pretreatment liquid in a glass Petri dish of diameter 90 mm, and following drying at 150° C. for 10 minutes, inkjet jetting the ink used in the third step onto the Petri dish, and measuring the dot diameter of a single landed ink dot (wherein the term "single" means an ink dot that has not mixed with another ink dot). A textile printer MMP-813BT (product name) manufactured by Mastermind Inc. was used as the inkjet printer. A larger ink dot diameter indicates a weaker ink aggregation force, whereas a smaller diameter indicates a stronger ink aggregation force. Accordingly, the ink aggregation forces of the pretreatment liquids containing a coagulant shown in the table are, in order of strength, the pretreatment liquid A1 and then the pretreatment liquid B2.

TABLE 6

| Raw material | Product name | Pretreatment liquid A1 | Pretreatment liquid B1 | Pretreatment liquid B2 |
| --- | --- | --- | --- | --- |
| Coagulant (cationic polymer) | SHALLOL DC-902P | 5.0 | — | 0.4 |
| Coagulant (metal salt) | Calcium chloride | — | — | — |
| Fixing agent | SUPERFLEX 470 | 13.2 | — | 13.2 |
| Surfactant | OLFINE E1020 | 1.0 | 1.0 | 1.0 |
| Water-soluble organic solvent | Diethylene glycol | — | — | 50.0 |
| Water | Ion-exchanged water | 80.8 | 99.0 | 35.4 |
| Total (% by mass) | | 100.0 | 100.0 | 100.0 |
| Ink dot diameter by aggregation force measurement | | 20 | — | 50 |

Details of the raw materials shown in the table were as follows.

SHALLOL DC-902P (product name): polydimethyldiallylammonium chloride 51%, a cationic polymer, manufactured by DKS Co., Ltd., active ingredient content: 51% by mass Calcium chloride: a metal salt, manufactured by FUJIFILM Wako Pure Chemical Corporation SUPERFLEX 470 (product name): a urethane resin emulsion, manufactured by DKS Co. Ltd., active ingredient content: 38% by mass OLFINE E1020 (product name): an acetylene glycol-based surfactant, manufactured by Nissin Chemical Industry Co., Ltd.

Diethylene glycol: a water-soluble organic solvent, manufactured by Wako Pure Chemical Corporation

Test Example 3

The first pretreatment liquid, the second pretreatment liquid and ink shown in Table 7 were prepared, the three steps described below were performed, and the obtained printed textile matter was evaluated using the method described below. The results are shown in the table.

(1) First Step

An air brush was used to coat a fabric (a 100% cotton woven fabric) with the first pretreatment liquid in a coating amount shown in the table.

(2) Second Step

An air brush was used to coat the fabric following completion of the first step with the second pretreatment liquid in a coating amount shown in the table.

(3) Third Step

Following completion of the second step, the fabric was heated in an oven at 150° C. for 60 seconds, the ink shown in the table was then inkjet printed onto the fabric, and the fabric was once again heated in an oven at 150° C. for 60 seconds to obtain a printed textile matter. The inkjet printing was performed using a textile printer MMP-813BT (product name) manufactured by Mastermind Inc. to print an 80 mm×80 mm solid image onto the fabric.

Evaluation Methods (1) Method for Evaluating Color Development

The OD value of the solid image of the printed textile matter was measured using a spectral colorimeter X-Rite eXact (manufactured by Videojet X-Rite K.K.) and evaluated against the following criteria.
A: OD value of 1.20 or higher
B: OD value of less than 1.20 but at least 1.15
C: OD value of less than 1.15 but at least 1.10

(2) Method for Evaluating Dry Rubbing Fastness

The dry rubbing fastness was evaluated in accordance with JIS L 0849: 2013 (Test Methods for Color Fastness to Rubbing), by using a Gakushin-type rubbing tester RT-200 (manufactured by Daiei Kagaku Seiki Mfg. Co., Ltd.) to rub a dried cotton cloth 100 times back and forth across the printed surface of the printed textile matter, and then evaluating the rub fastness against the following criteria.
A: grade 4 or higher
B: at least grade 2-3, less than grade 4
C: less than grade 2-3

TABLE 7

| | | Example 2-1 | Example 2-2 | Example 2-3 | Example 2-4 |
|---|---|---|---|---|---|
| | Type of fabric | cotton | cotton | cotton | cotton |
| First step | Pretreatment liquid | A1 | none | A1 | none |
| | Coating amount [g/m²] | 10 | — | 10 | — |
| Second step | Pretreatment liquid | B1 | none | none | B2 |
| | Coating amount [g/m²] | 10 | — | — | 10 |
| Third step | Ink | Ink 2-1 | Ink 2-1 | Ink 2-1 | Ink 2-1 |
| Evaluations | Color development | A | C | A | C |
| | Dry rubbing fastness | A | B | C | B |

Based on the results shown in the table, the following findings were evident. Example 2-1 which used the first pretreatment liquid containing a coagulant and the second pretreatment liquid having a lower ink aggregation force than the first pretreatment liquid exhibited favorable results for both the color development and the dry rubbing fastness. In contrast, Example 2-2 in which no pretreatment was performed exhibited poor color development, Example 2-3 in which the second step was not performed exhibited favorable color development but poor dry rubbing fastness, and Example 2-4 in which the first step was not performed and a pretreatment liquid having an extremely low concentration of coagulant was used exhibited poor color development.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for producing printed matter, the method comprising:
applying, with a serial-jetting inkjet recording apparatus comprising a recording head unit having at least three recording heads, one of a first pretreatment liquid and a second pretreatment liquid, another of the first pretreatment liquid and the second pretreatment liquid, and an aqueous ink, in this order, to a recording region of a substrate while the substrate is transported once,
wherein the first pretreatment liquid, the second pretreatment liquid, and the aqueous ink are supplied individually into respective recording heads of the at least three recording heads and applied from the respective recording heads,
the first pretreatment liquid and the second pretreatment liquid are jetted so as to land on the substrate in a fixed order therebetween in the one transportation, and
the first pretreatment liquid comprises a coagulant, and the second pretreatment liquid does not comprise a coagulant, but comprises a penetrant.

2. The method for producing printed matter according to claim 1, wherein the method applies the second pretreatment liquid, the first pretreatment liquid and the aqueous ink, to the substrate in this order.

3. The method for producing printed matter according to claim 1, wherein the coagulant comprises an organic acid.

4. The method for producing printed matter according to claim 1, wherein the penetrant comprises at least one material selected from the group consisting of a surfactant, and a water-soluble organic solvent having an SP value of not more than 14 $(cal/cm^3)^{1/2}$.

5. The method for producing printed matter according to claim 4, wherein the surfactant comprises a silicon-based surfactant.

6. The method for producing printed matter according to claim 1,
wherein for the pretreatment liquid that lands on the substrate first between the first pretreatment liquid and the second pretreatment liquid, at least one time difference selected from the group consisting of (i) a landing time difference $\Delta T_X$ between two dots which are arranged along a main scanning direction and for which a distance between the dots reaches a shortest value among any two dots arranged along the main scanning direction, and (ii) a landing time difference $\Delta T_Y$ between two dots which are arranged along a direction that intersects the main scanning direction and for which a distance between the dots reaches a shortest value among any two dots arranged along a direction that intersects the main scanning direction, is at least 10 ms.

7. The method for producing printed matter according to claim 1, wherein the method comprises applying the first pretreatment liquid, the second pretreatment liquid and the aqueous ink to the substrate in this order.

8. The method for producing printed matter according to claim 7, wherein the first pretreatment liquid comprises water and an ink coagulant.

9. The method for producing printed matter according to claim 8, wherein the first pretreatment liquid comprises from 1 to 20% by mass of the ink coagulant relative to the total mass of the first pretreatment liquid.

10. The method for producing printed matter according to claim 7, wherein the amount applied of the second pretreatment liquid per unit of the recording region of the substrate is within a range from 0.5 to 15 g/m$^2$.

11. The method for producing printed matter according to claim 2, wherein the coagulant comprises an organic acid.

12. The method for producing printed matter according to claim 2, wherein the penetrant comprises at least one selected from the group consisting of a surfactant, and a water-soluble organic solvent having an SP value of not more than 14 (cal/cm$^3$)$^{1/2}$.

13. The method for producing printed matter according to claim 12, wherein the surfactant comprises a silicon-based surfactant.

14. The method for producing printed matter according to claim 2,
wherein for the pretreatment liquid that lands on the substrate first between the first pretreatment liquid and the second pretreatment liquid, at least one time difference selected from the group consisting of (i) a landing time difference $\Delta T_X$ between two dots which are arranged along a main scanning direction and for which a distance between the dots reaches a shortest value among any two dots arranged along the main scanning direction, and (ii) a landing time difference $\Delta T_Y$ between two dots which are arranged along a direction that intersects the main scanning direction and for which a distance between the dots reaches a shortest value among any two dots arranged along a direction that intersects the main scanning direction, is at least 10 ms.

15. The method for producing printed matter according to claim 1, wherein the coagulant comprises a polyvalent metal, or a cationic resin, or a combination thereof.

16. The method for producing printed matter according to claim 1, wherein the second pretreatment liquid comprises not less than 10% by mass of a water-soluble organic solvent having an SP value of not more than 14 (cal/cm$^3$)$^{1/2}$, relative to a total amount of the second pretreatment liquid.

* * * * *